United States Patent
Jupina

(10) Patent No.: US 11,331,551 B2
(45) Date of Patent: *May 17, 2022

(54) AUGMENTED EXTENDED REALM SYSTEM

(71) Applicant: Villanova University, Villanova, PA (US)

(72) Inventor: Mark A. Jupina, Harleysville, PA (US)

(73) Assignee: Villanova University, Villanova, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/120,319

(22) Filed: Dec. 14, 2020

(65) Prior Publication Data

US 2021/0187374 A1 Jun. 24, 2021

Related U.S. Application Data

(63) Continuation of application No. 16/213,293, filed on Dec. 7, 2018, now Pat. No. 10,864,422.

(60) Provisional application No. 62/596,810, filed on Dec. 9, 2017, provisional application No. 62/596,803, filed on Dec. 9, 2017, provisional application No. 62/596,807, filed on Dec. 9, 2017.

(51) Int. Cl.
*A63B 69/00* (2006.01)
*A63B 71/06* (2006.01)

(52) U.S. Cl.
CPC ...... *A63B 69/0002* (2013.01); *A63B 71/0622* (2013.01)

(58) Field of Classification Search
None
See application file for complete search history.

(56) References Cited

U.S. PATENT DOCUMENTS

| | | | |
|---|---|---|---|
| 5,377,100 A | 12/1994 | Pope et al. |
| 5,694,340 A | 12/1997 | Kim |
| 6,102,846 A | 8/2000 | Patton |
| 6,257,983 B1 | 7/2001 | Rimoto |
| 2011/0022202 A1 | 1/2011 | Lundback |
| 2013/0034837 A1 | 2/2013 | Clapp |

(Continued)

OTHER PUBLICATIONS

Nathan, Alan M., "Analysis of PITCHf/x Pitched Baseball Trajectories", Department of Physics, University of Illinois, Dec. 9, 2007. http://baseball.physics.illinois.edu/.

(Continued)

*Primary Examiner* — Kevin Y Kim
(74) *Attorney, Agent, or Firm* — Duane Morris LLP

(57) ABSTRACT

A machine implemented method for simulated sports training includes the steps displaying a simulated environment having one or more virtual objects of a sporting event; displaying to a user a moving object in the simulated environment in accordance with object path data representing an object path and conditions of motion of the moving object as a function of time; correlating soundscape data to the object path data, the soundscape data being dependent on both object path of the moving object in the object path and the conditions of motion; and outputting sound to the user based on the correlated soundscape data either before or during displaying to the user the moving object, thereby providing spatial auditory clues for assisting tracking eye movements of the user to train the user to anticipate or recognize a trajectory of the moving object.

20 Claims, 26 Drawing Sheets

(56) References Cited

U.S. PATENT DOCUMENTS

2016/0314620 A1  10/2016  Reilly et al.
2017/0151484 A1   6/2017  Reilly et al.

OTHER PUBLICATIONS

Wilmer, et al., "Two Distinct Visual Motion Mechanisms for Smooth Pursuit Evidence from Individual Differences", Neuron 54, pp. 987-1000 (2007).
Excerpt: Horowitz, Seth, "The Universal Sense: How Hearing Shapes the Mind", Bloomsbury, New York, pp. 201-204 (2012) (Kindle Edition).
https://en.wikipedia.org/wiki/Octave; Downloaded Jan. 29, 2019.
Gray, Rob, "Transfer of Training from Virtual to Real Baseball Batting, Frontiers in Psychology", Dec. 13, 2017, https://doi.org/10.3389/fpsyg.2017.02183.
Holliday, Joshua, "Effect of Stroboscopic Vision Training on Dynamic Visual Acuity Scores: Nike Vapor Strobe® Eyewear" (2013). All Graduate Plan B and other Reports. 262. https://digitalcommons.usu.edu/gradreports/262.
Palidis DJ, et al., "Distinct eye movement patterns enhance dynamic visual acuity", PLOS ONE 12(2): e0172061.doi:10.137/journal.pone.0172061, (Feb. 10, 2017).
Steinhausen, et al., "A Three Sensor Eye Tracking System based on Electrooculography", IEEE Sensors 2014 Proceedings, pp. 1084-1087 (2014).
Webpage of Narbis.com, Retrieved from the Internet on Jan. 30, 2019, via the Wayback Machine as captured Sep. 30, 2017, at URL: <<http://web.archive.org/web/20170930175803/http://narbis.com>>, 13 pages.
Webpage pf ChrisOLeary.com, entitled "Pitching Mechanics", Retrieved from the Internet on Jan. 30, 2019, via the Wayback Machine as captured Apr. 22, 2018, at URL: <<https://web.archive.org/web/20180422113638/http://www.chrisoleary.com/projects/PitchingMechanics101/Essays/PitchingMechanics, 19 pages.
Webpage of Vive.com, entitled "VIVE, VIVE Virtual Reality System", Retrieved from the Internet on Jan. 30, 2019, via the Wayback Machine as captured Jan. 7, 2018, at URL: <<https://web.archive.org/web/20180107025133/https://www.vive.com/us/product/vive-virtual-reality-system, 12 pages.
Webpage of Walabot.com, entitled "DIY Smart Stud Finder Sees 4 inches Into Your Walls", Retrieved from the Internet an Jan. 30, 2019, via the Wayback Machine as captured Nov. 24, 2017, at URL: <<https://web.archive.org/web/20171124083918/https://www.walabot.com/diy, 7 pages.
Webpage of Vive.com, entitled "VIVE, Discover Virtual Reality Beyond Imagination", Retrieved from the Internet on Jan. 30, 2019, via the Wayback Machine as captured Nov. 18, 2018, at URL: <<https://web.archive.org/web/20171118051028/https://www.vive.com/us, 8 pages.

AUGMENTED EXTENDED REALM SYSTEM

CROSS-REFERENCE TO RELATED APPLICATION

This application is a continuation of and claims priority to U.S. patent application Ser. No. 16/213,293 filed Dec. 7, 2018, which claims priority to U.S. Provisional Patent Application Ser. Nos. 62/596,810 filed Dec. 9, 2017, 62/596,803 filed Dec. 9, 2017, and 62/596,807 filed Dec. 9, 2017, the entirety of each of which is incorporated herein by reference.

FIELD

The present invention relates in general to systems and methods for training individuals, such as athletes. More particularly, the invention is directed to virtual reality simulated training systems and methods, such as for use in sports training.

DESCRIPTION OF THE RELATED ART

Virtual reality environments may provide users with simulated experiences for athletic endeavors. However, conventional virtual reality sports simulators do not provide meaningful training experiences and feedback regarding the performance of a player.

SUMMARY OF THE INVENTION

In embodiments, a machine implemented method for simulated sports training includes the steps displaying a simulated environment having one or more virtual objects of a sporting event; displaying to a user a moving object in the simulated environment in accordance with object path data representing an object path and conditions of motion of the moving object as a function of time; correlating soundscape data to the object path data, the soundscape data being dependent on both object path of the moving object in the object path and the conditions of motion; and outputting sound to the user based on the correlated soundscape data either before or during displaying to the user the moving object, thereby providing spatial auditory clues for assisting tracking eye movements of the user to train the user to anticipate or recognize a trajectory of the moving object.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, in which.

DETAILED DESCRIPTION

Figure 1:
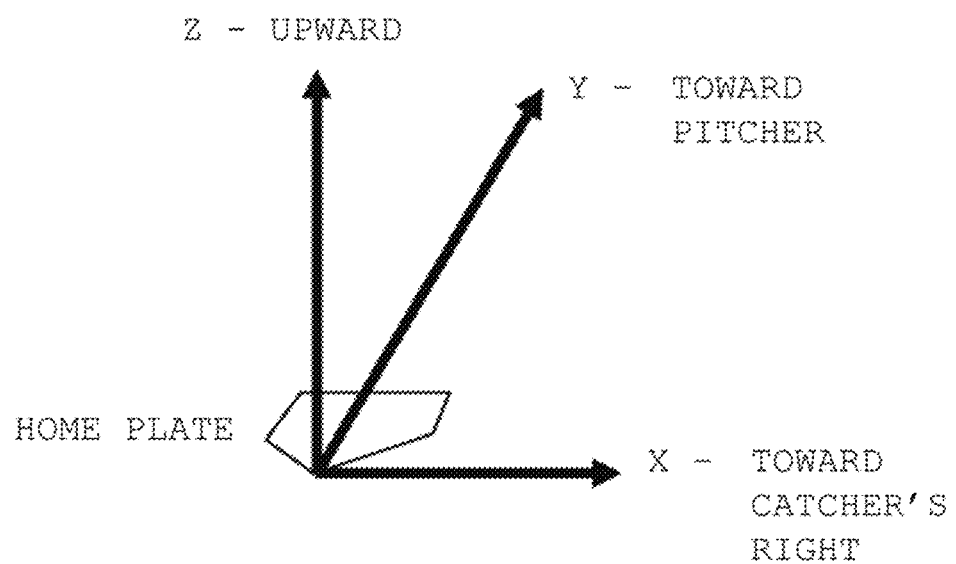
FIG. 1 shows the x, y, z directions of a Cartesian coordinate system relative to home plate.

This description of the exemplary embodiments is intended to be read in connection with the accompanying drawings, which are to be considered part of the entire written description. The use of the singular includes the plural unless specifically stated otherwise. The use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the subject matter described.

The following description is provided as an enabling teaching of a representative set of examples. Many changes can be made to the embodiments described herein while still obtaining beneficial results. Some of the desired benefits discussed below can be obtained by selecting some of the features discussed herein without utilizing other features. Accordingly, many modifications and adaptations, as well as subsets of the features described herein are possible and can even be desirable in certain circumstances. Thus, the following description is provided as illustrative and is not limiting.

As used herein, use of a singular article such as "a," "an" and "the" is not intended to exclude pluralities of the article's object unless the context clearly and unambiguously dictates otherwise.

Research has demonstrated that training outcomes are improved when practice is designed so that the task difficulty is appropriately matched to the performer's skill level. In the extended realm (XR), the training experience can be controlled and even augmented in ways that cannot be replicated by training in the real world. Studies suggest that the real value of using the XR as a training tool is not in its ability to create more repetitions of the same types of practice used in real training, but instead, comes from its ability to create unique, evidence-based training conditions that are impossible or highly impractical to use in real training. In embodiments disclosed herein of an augmented extended realm (AXR), various methods and techniques are applied in a skill-level appropriate trainer that assists the user's tracking eye movements such that the user can correctly anticipate or recognize the path or trajectory of some object early in the object's motion.

Embodiments described herein are directed to virtual reality sports training systems and methods. Virtual reality environments provide users with computer-generated virtual objects which create an illusion to the users that they are physically present in the virtual reality environment. Users typically interact with the virtual reality environment by employing some type of device such as headset goggles, glasses, or mobile devices having displays, augmented reality headgear, or through a cave automatic virtual environment (CAVE) immersive virtual reality environment where projectors project images to the walls, ceiling, and floor of a cube-shaped room.

Embodiments of the AXR training system and methods target human performance applications that occur over very short intervals of time, e.g., a few seconds at the most, where tracking of an object by the "smooth pursuit" of the eyes is critical. For example, research has demonstrated that elite professional baseball hitters react to stimuli no faster, on average, than the general population. These professional players hit the ball better than the average player since they can anticipate where the ball is going before crossing home plate. In embodiments, visual, audio, and tactile stimuli are integrated into the AXR training environment so as to assist the user to develop the correct anticipation of the path of the object. Metrics are built into the training embodiment to gauge over time the performance of the user's tracking eye movements.

Embodiments of methods utilized to generate the motion data for a moving object in the AXR are described. A description of the various stimuli utilized in the embodiments to train the user's early recognition of the impending path that a tracked object in a simulator will undertake is also provided. In one embodiment, the tracking eye movements performance is gauged in the vision application version of the system where realistic, skill-level appropriate pitches of baseballs or softballs are tracked by the user. Training specific applications of system include training an umpire, a catcher, and a hitter where metrics are added into the vision application that allow for the evaluation of the performance of an umpire, a catcher, and a hitter, respectively. Embodiments of system and method described herein are not limited to training baseball and softball players but could be used in other sports, such as tennis and table tennis, lacrosse, hockey and soccer, and cricket. Applications of described embodiments are also not limited to training athletes but could also be used in other training scenarios where both eyes are required to precisely lock onto a target moving at high speed for a short duration of time. Occupations that require similar visual skills include airline pilots, air traffic controllers, police, firefighters, camera operators, and quality control inspectors.

Embodiments described herein refer to virtual reality simulated environments. However, it shall be understood that one or more embodiments may employ augmented reality environments comprising both virtual and real-world objects. As used herein and as is commonly known in the art, the terms "simulated environments," "simulated," "virtual," "augmented," and "virtual reality environment" may refer to environments or video displays comprising computer-generated virtual objects or computer-generated virtual objects that are added to a display of a real (or generated) scene, and may include computer-generated icons, images, virtual objects, text, or photographs. Embodiments described herein may employ head mounted displays or immersive systems as specific examples of virtual reality environments. It shall be understood that embodiments may employ head mounted displays, immersive systems, mobile devices, projection systems, or other forms of simulated environment displays. Any reference made herein to a mobile device is for illustration purposes only and shall not be deemed limiting. Mobile device may be any electronic computing device, including handheld computers, smart phones, tablets, laptop computers, smart devices, GPS navigation units, or personal digital assistants for example.

Motion Data Generation for Extended Realm Simulators

Aspects of the embodiment of the present disclosure involve simulating an object's motion as a function of time. In embodiments, nine initial parameters of motion are used in a simulation model provided by a dynamic systems simulator, such as using the SIMULINK® software modelling tool available from The MathWorks, Inc. of Natick, Mass., to create an object's motion as a function of time. In embodiments, the SIMULINK® model simulation is called from within a script which runs in MATLAB® software, or other mathematical modeling tool that can be paired with a dynamic systems simulator. The mathematical modelling tool reads the initial conditions of motion from a spreadsheet, database, or text file. The initial positions of an object in a Cartesian coordinate system for all three dimensions, the initial velocities of the object in all three directions in a Cartesian coordinate system, and the initial accelerations of the object in all three directions in a Cartesian coordinate system are inputted into the SIMULINK® model. The coefficients for drag and lift (Magnus Effect due to an object's rotation), the spin axis vector, the Magnus Force vector, and the initial direction vector are calculated in the MATLAB® software from the velocity and acceleration values. The coefficients for drag and lift and the spin axis angles are also parameters utilized in the equations of motion. The angular velocity or spin rate of the object is determined from the lift coefficient or is assumed by the user. The rotation angle around the spin axis as a function of time is derived from the angular velocity.

Figure 23:
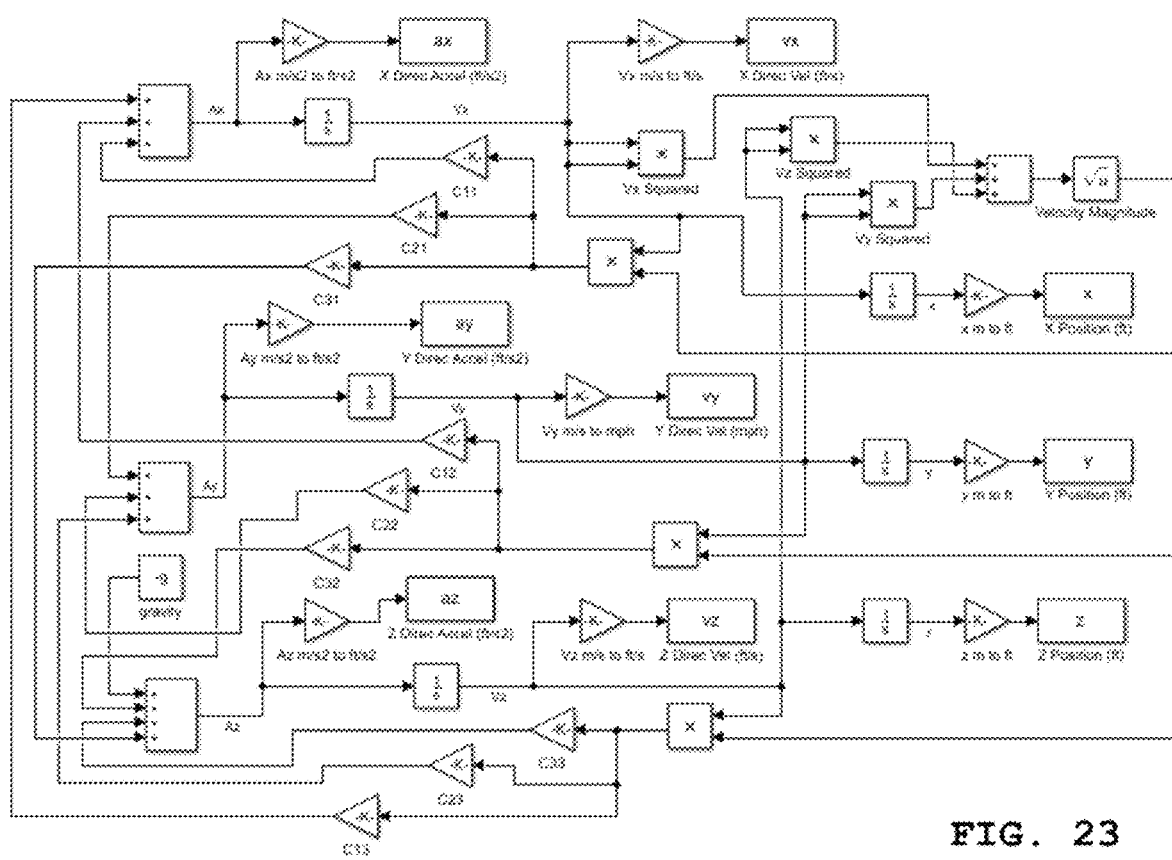
FIG. 23 illustrates a coded model of the three equations of motion for a baseball for use in an augmented reality simulator training system according to certain embodiments.

In one embodiment, tailored for use in a baseball pitch augmented simulation system, the sources of the initial conditions of motion may include, but are not limited to: (i) Major League Baseball (MLB) pitch data that is publicly available from a PITCHf/x database, such as is available at http://www.brooksbaseball.net/pfxVB/pfx.php (visited Dec. 3, 2018); (ii) pitch data measured through the use of either camera, radar, or inertial measurement systems; (iii) and hypothetical pitch data created by a user (from scratch or as modifications of the previous sources of data). In the baseball pitch augmented simulation system embodiment, the three equations of motion for a baseball are coded in a SIMULINK® model shown in FIG. 23. In the one embodiment, the SIMULINK® block diagram was created to model the three non-linear differential equations of motion for a traveling object subjected to the forces of drag, lift, and gravity. The nine coefficients (C11, C12, C13, C21, C22, C23, C31, C32, and C33) in the three equations of motion are represented by gain blocks (shown as triangles) which are coded as equations dependent on the mass and cross-sectional area of the ball, the air density, the spin axis orientation angles, and the lift and drag coefficients. Other gain blocks convert between different units in the block diagram. Integrators are represented by the "1/s" blocks, blocks with a "x" symbol are multiplication blocks, blocks with "+" symbols add the terms in the equation together, the effect of gravity is represented by a constant block with a "-g" in a square box, and variables in the rectangular boxes represent outputs. The output of the SIMULINK® model provides the 3D values of position, velocity, and acceleration as a function of time at a rate of 240 data points per second (a data point once every 4.167 milliseconds). The MATLAB® software calculates the angles of rotation to orient the baseball correctly at the initial release position based on the pitch thrown (fastball, curveball, etc.), the handedness (left or right) of the pitcher, and the spin axis angles. The software calculates the spin axis vector and rotation angle about this vector as a function of time so as to properly orient the spin axis of a baseball and provide the correct rotation angle as the ball travels along its trajectory. The VRROTVEC function available in the MATLAB® software is used to create a path orientation axis-angle vector value from the velocity vector values as a function of time and then generates a rotation matrix with the VRROTVEC2MAT function, which describes how the spin axis vector is rotated into the correct orientation at each position along the ball's trajectory. The final orientation of the ball at each point in time along the trajectory is determined through the quaternion product of one quaternion representing the path's orientation axis-angle vector and the other quaternion representing the spin axis vector along with the rotation angle about this spin axis. The MATLAB® software algorithm also ensures that the final orientation axis vector derived from the quaternion product does not "flip" or become negative because of the calculation. Consequently, the result of this incorrect, flipped axis data at a point in time would be the rotation of a projectile in the opposite direction relative to the correct direction of rotation.

Based on the input variables described above, the mathematical modeling tool (e.g., MATLAB® software) generates a motion data file for use in an extended realm simulation where the following information is stored in the header of the file: (i) the number of data points for the pitch, (ii) the pitch type (fastball, curveball, etc.), (ii) the magnitude of the initial velocity of the pitch, (iii) three angles describing the orientation of the ball when the ball is released, (iv) the point in time when the ball is approximately 6 feet from the tip of home plate, (v) the point in time when the ball is approximately at the front edge of home plate, and (vi) orientation angles for the spin axis vector at ball release. In the body of the motion data file, the following information is stored as a function of time: (i) the X, Y, and Z position values, (ii) the final orientation axis vector and the rotation angle about this axis, (iii) the velocity values in the X, Y, and Z directions, and (iv) the acceleration values in the X, Y, and Z directions.

Figure 9:
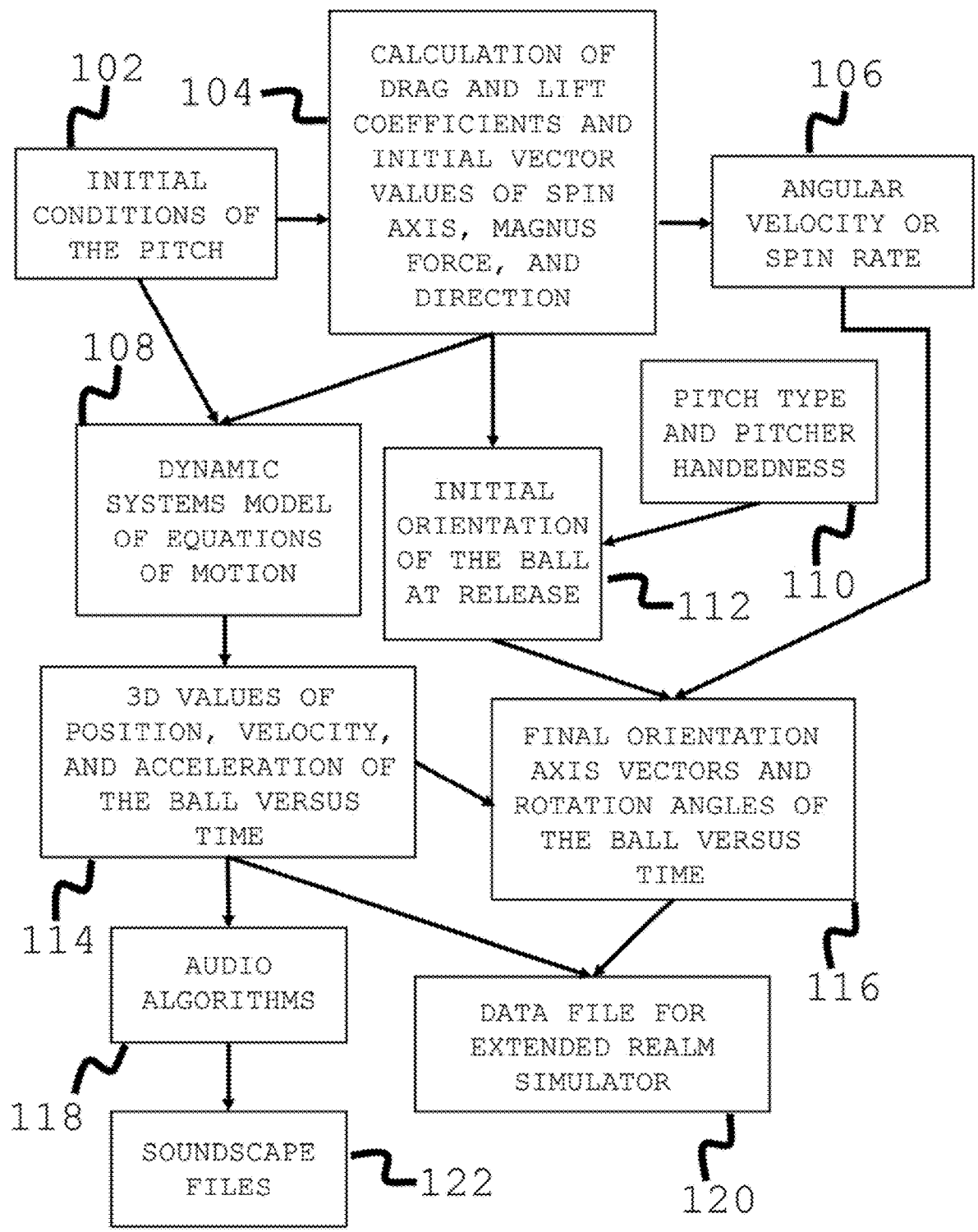
FIG. 9 illustrates a flow diagram of a method for generating pitch data for use in an augmented reality pitch simulator training system.

FIG. 9 illustrates a flow diagram of a method 100 for generating pitch data for use in an augmented reality pitch simulator training system. At 102, the initial conditions (e.g., nine initial parameters of motion) are selected or obtained. At 104, the drag and lift coefficients and the initial vector values of the spin axis, Magnus force, and direction or trajectory are calculated based on the initial conditions. At 106, the angular velocity is calculated based on the lift coefficient. At 108, the initial conditions from 102 and the lift and drag coefficients from 104 are used to formulate the equations of motion. At 112, the initial orientation of the ball at pitch release is determined from the orientation of the ball laces from 110 due to the pitch type and handedness (left or right) of the pitcher along with rotating the ball into place by aligning the ball along the spin axis vector from 104. At 114, the 3D values of position, velocity, and acceleration of the ball as a function of time are generated by the dynamic systems model in 108. At 116, the final orientation axis vectors and rotation values about these vectors are calculated as a function of time utilizing the procedure described in the paragraph above where the values of angular velocity from 106, initial orientation of the ball at release from 112, and the velocity vector values as a function of time from 114 are used in this calculation. At 118, the audio algorithms both above and below 1500 Hz utilize the 3D positional values and the initial velocity from 114 to generate the soundscape files at 122. All temporal data from 114 and 116 are stored in a data file at 120 for use in the extended realm simulator.

It should be understood that the information stored in the above-described motion data file is used in the simulation to illustrate the path of a given pitch and to support different features of the augmented reality system described below.

The ability of individuals to lock their eyes onto a moving object varies greatly from person to person. This variation from person to person correlates strongly to a specific type of motion perception ability, known as high-level motion perception. Therefore, sensory training focused on high-level motion perception could improve a person's ability to lock onto and analyze the motion of an oncoming object. Various embodiments of systems and methods are described below for sensory training of high-level motion perception using extended realm simulators. In embodiments, visual, audio, and tactile stimuli are integrated into an extended realm trainer so as to assist the user to develop the correct anticipation of the path of the object.

Figure 10:
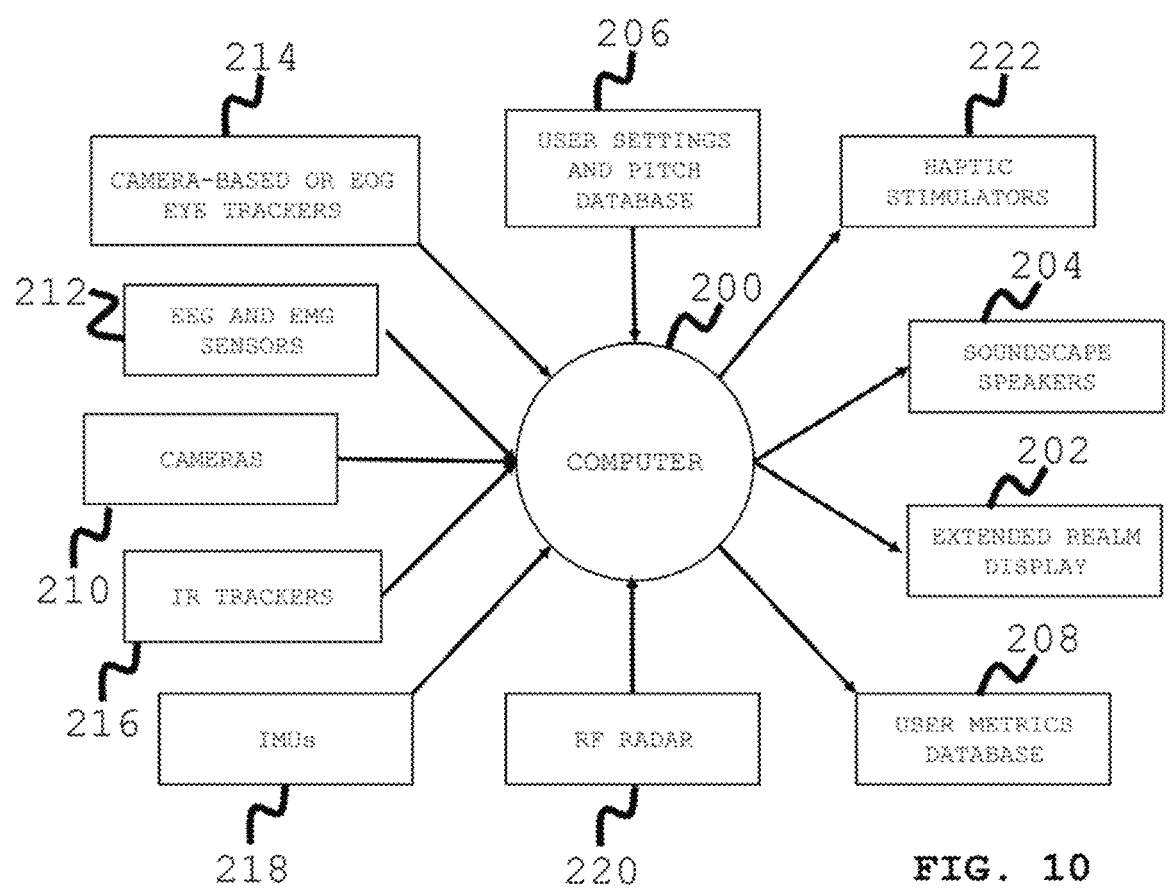
FIG. 10 is a block diagram illustrating components of an augmented reality pitch simulator training system according to certain embodiments.

FIG. 10 is a block diagram illustrating components of an augmented reality pitch simulator training system according to certain embodiments. These components are used in various embodiments of an augmented reality simulator training system described below. Components include one or more computers 200 or other processing systems for implementing the functionality of the system and the methods of operating and using the system described herein. The system includes an extended realm display 202 for displaying the simulated environment to the user. In embodiments, the display can be a display for a virtual reality environment as described above. The system includes soundscape speakers 204 for outputting soundscape tones described with respect to embodiments that provide audio stimuli through soundscapes. It should be understood that the system can include any suitable audio equipment, including software on computer 200, for converting sound files into signal for driving soundscape speakers 204. The system includes an input (e.g., keyboard, GUI, mouse, microphone, etc.) not shown for selecting amongst user settings and pitch data from a user settings and pitch database 206. User metrics (e.g., training data) are stored in a user metrics database 208. The system includes one or more cameras 210, EEG and EMG sensors 212, camera-based and/or EOG eye trackers 214, IR trackers 216, inertial measurement units (IMUS) 218, RF imaging and radar 220, and haptic simulators 222 that are used in various embodiments described herein.

Audio Stimuli Through Soundscapes

In embodiments, another sense, such as hearing, is used to help in this high-level motion perception training, which can enhance the efficacy of the training. Since hearing is a quantitatively faster sense (0.05 seconds to recognize a sound) and highly discriminating, one's hearing can assist another sense, such as sight, in training the brain. Consequently, the high-level motion perception in a sighted-person could be enhanced through the proper auditory training while the person is immersed in a surround sound environment. Applications involving sports training in the extended realm, such as baseball, softball, lacrosse, tennis, table tennis, hockey, soccer, and cricket, are possible where the perceived motion occurs in very short intervals of time. Applications of this approach are not limited to training athletes, but could also be used in other training scenarios, such as in video simulators, where both eyes are required to precisely lock onto a target moving at high speed for a short duration of time. Many different training scenarios are possible where the addition of sound or the lack of sound along with the timing of the sound's occurrence could be used to enhance the training regimen of foveal vision.

Mathematical simulation software, such as MATLAB® software, is used to create a unique soundscape file correlated to a projectile's flight, such as a way file or other audio file formats, which is composed of a sequence of audible tones representing the path and the initial velocity of a moving object. In embodiments, the frequency range of the tones is from 16.35 Hz to 16,266 Hz. Twenty-four quarter tones in each of the ten octaves or 240 tones total are available over this frequency range. In one embodiment for an augmented reality pitch simulator training system, the initial frequency of the tones is based on the baseball's initial velocity. The X, Y, and Z directions of a Cartesian coordinate system are depicted relative to home plate in FIG. 1. For example, an initial velocity of 95 mph is represented by an initial tone with a frequency of 4435 Hz in the sequence of tones. The frequency of the tones then varies with the height or Z coordinate position of the baseball. While the baseball travels, the tones vary over a single octave only. Thereby, if a range in height over an eight-foot distance is divided into 24 zones, then each of the 24 quarter tones represents a single zone with a height range of about ⅓ foot. The stereo balance is based on the X coordinate position of the ball where louder audio is heard on the left channel relative to the right channel for ball positions on the negative X axis, for example. The volume level or signal amplitude is based on the Y coordinate position of the ball where the sound level increases on all channels as the ball approaches Y=0 or the tip of home plate. The superior olive in humans uses amplitude differences only for sound heard by each ear for frequencies above about 1,500 Hz when determining the origin of a sound source. Therefore, frequencies above this value are used in this embodiment.

Figure 13A:
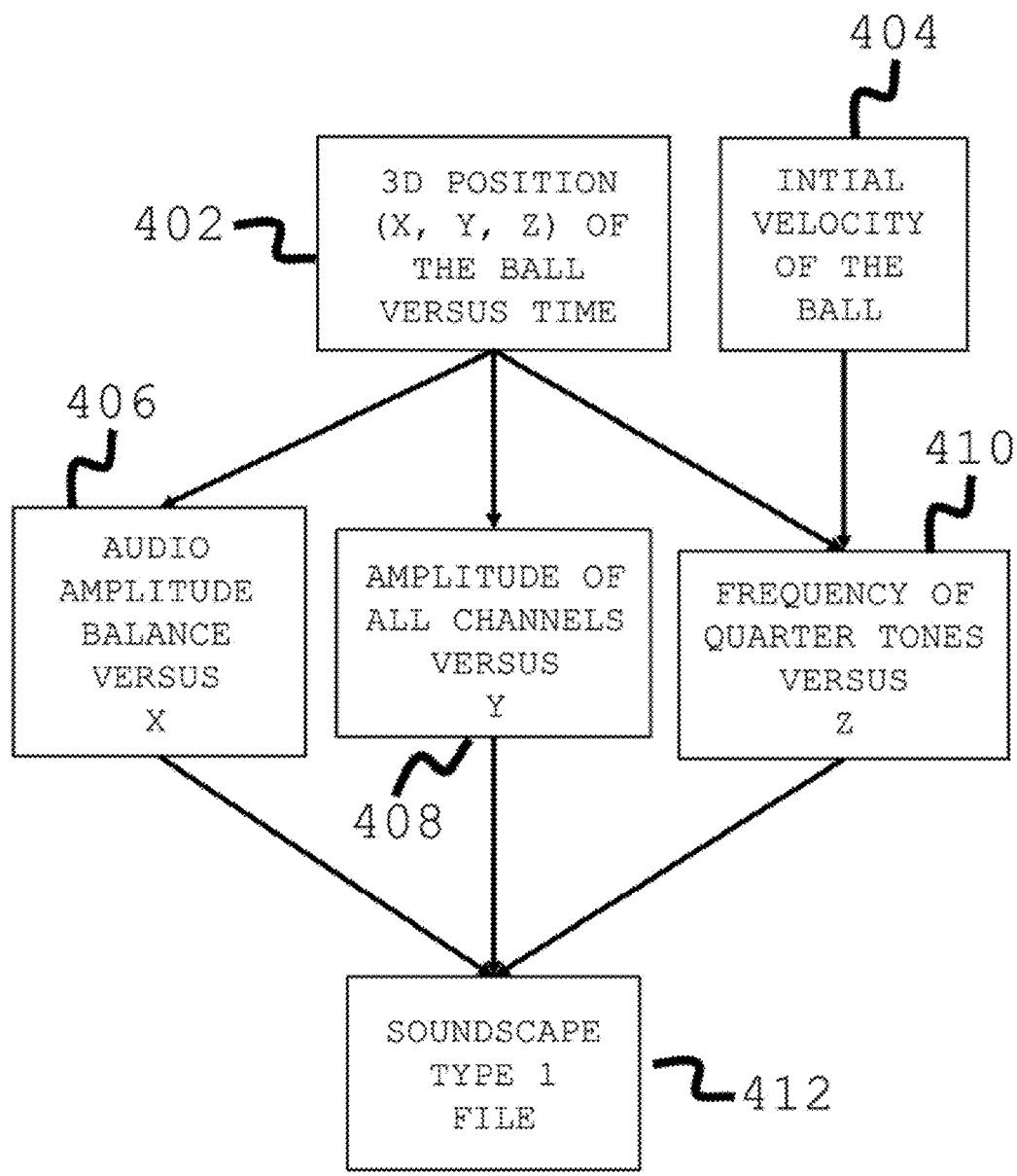
FIG. 13A illustrates a flow diagram of a method for generating soundscapes for tones above 1500 Hz.

FIG. 13A illustrates an embodiment of a method 400A of generating soundscapes for tones above 1500 Hz. At step 402 the 3D position (X, Y and Z) of the ball versus time is obtained from a pitch data file generated, for example, in the manner discussed above in connection with FIG. 9. The initial velocity of the ball is also obtained at step 404. At step 406, the stereo balance of the audio signal varies as a function of X where ball positions along the negative X axis produce louder tones on the left channel of the audio system relative to the right channel and ball positions along the positive X axis produce louder tones on the right channel of the audio system relative to the left channel. At step 408, all audio channels increase in loudness as the object in motion approaches Y=0. At step 410, the initial frequency of the quarter tone in the soundscape is determined by the initial velocity of the object in motion in 404. If the object goes higher (increase in Z value) then the frequency of the tone increases whereas if the object falls (decrease in Z value) then the frequency of the tone decreases. At step 412, the data generated at steps 406, 408 and 410 are accumulated into a soundscape file for use with a pitching simulation and associated with a pitch data file.

For tones made up of frequencies below about 1,500 Hz, the superior olive relies on differences in fine timing or phase differences between the sounds received at each ear. Consequently, in a second embodiment, the phase difference between the signals of the right channel and the left channel are varied as a function of the X coordinate where for negative X values, the phase difference is such that the right channel signal is lagging the left channel signal, and for positive X values, the phase difference is such that the right channel signal is leading the left channel signal. For X position values between −2 feet and +2 feet, the phase difference varies from −90 to +90 degrees. In this second embodiment, an initial velocity of 95 mph is represented by an initial tone with a frequency of 554.37 Hz in the sequence of tones which is three octaves lower than the initial tone in the first embodiment described. The variation in the tones as a function of the Y and Z positions is the same as the first embodiment.

Figure 13B:
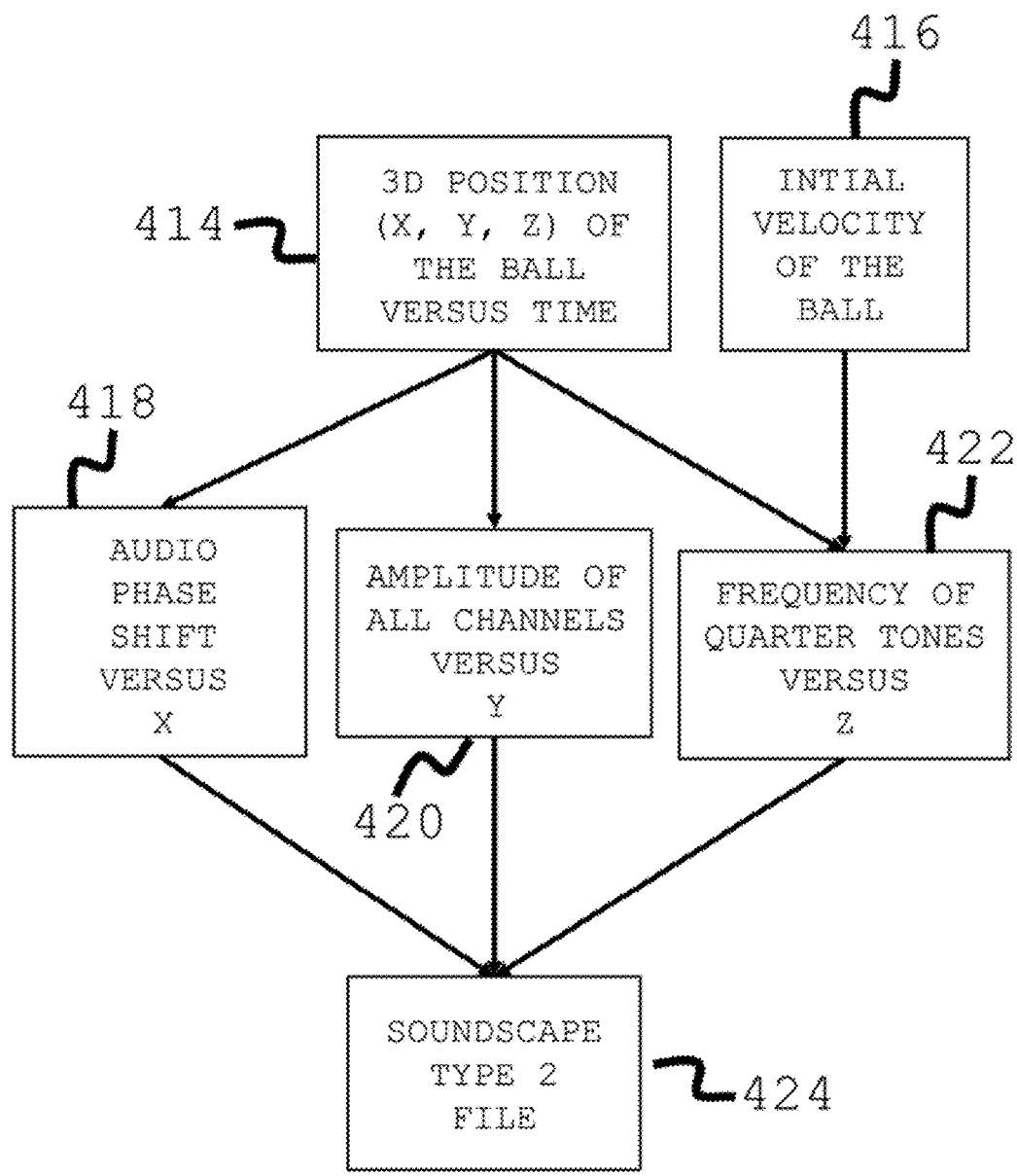
FIG. 13B illustrates a flow diagram of a method for generating soundscapes for tones below 1500 Hz.

FIG. 13B illustrates an embodiment of a method 400B of generating soundscapes for tones below 1500 Hz. At step 414 the 3D position (X, Y and Z) of the ball versus time is obtained from a pitch data file generated, for example, in the manner discussed above in connection with FIG. 9. The initial velocity of the ball is also obtained at step 416. At step 418, the relative phase difference between the audio signals on the left and right channels varies as a function of X where ball positions along the negative X axis produce the situation where the right channel signal is lagging the left channel signal, and ball positions along the positive X axis produce the situation where the right channel signal is leading the left channel signal. At step 420, all audio channels increase in loudness as the object in motion approaches Y=0. At step 422, the initial frequency of the quarter tone in the soundscape is determined by the initial velocity of the object in motion in 416. If the object goes higher (increase in Z value) then the frequency of the tone increases whereas if the object falls (decrease in Z value) then the frequency of the tone decreases. At step 424, the data generated at steps 418, 420 and 422 are accumulated into a soundscape file for use with a pitching simulation and associated with a pitch data file.

In a third embodiment, soundscapes with tones both above and below 1500 Hz can be combined since the human ear tends to hear tones one or more octaves apart as being essentially "the same", due to closely related harmonics. This is known as octave equivalency and with this approach, the superior olive is provided spatial auditory clues of an object's position using both amplitude and phase difference variations of the tones within the soundscape. For a training regimen of foveal vision in these embodiments of an augmented reality pitch simulator training system, the occurrence of the soundscape either before or at the release of the pitched ball provides spatial auditory clues that assist the user's tracking eye movements such that the user can correctly anticipate or recognize the trajectory of the pitched ball earlier within its flight. Through a staircase adaptive training approach (e.g., one where the level of difficulty is increased or decreased in steps dependent on success/failure of a test), the optimal lead time for the soundscape is determined for the user. Thereby, the user can benefit the most from the use of training with an anticipatory soundscape. In this embodiment, data from the soundscape files generated in accordance with the methods of FIGS. 13A and 13B can be combined into a soundscape file.

Other similar embodiments of this augmented reality pitch simulator training system with motion tracking and auditory feedback applicable to other sports training and extended reality applications are possible. One of the unique features of these embodiments lies in the use of a real-time auditory feedback system providing a unique soundscape of the perceived projectile in an extended realm. In this sound system, a unique sequence of tones, whose frequency, amplitude, and phase are varied in the audio channels which are dependent on or correlated to both the path and the initial velocity of the projectile, provides both spatial and temporal clues to the brain in predicting both the location and arrival time of the projectile. In this manner, stimulation of the auditory sense provides additional feedback to the user's brain in assisting the trainee to execute the required physical motion or response at an enhanced level of efficacy.

Additional Visual Stimuli Through the Use of Static and Dynamic Assets

In embodiments of the extended realm trainer, the use of additional static (no motion) and dynamic (moving) visual assets are employed to assist in the training and in the evaluation of the tracking eye movements, as described in more detail below.

Static Visual Assets

Figure 2:
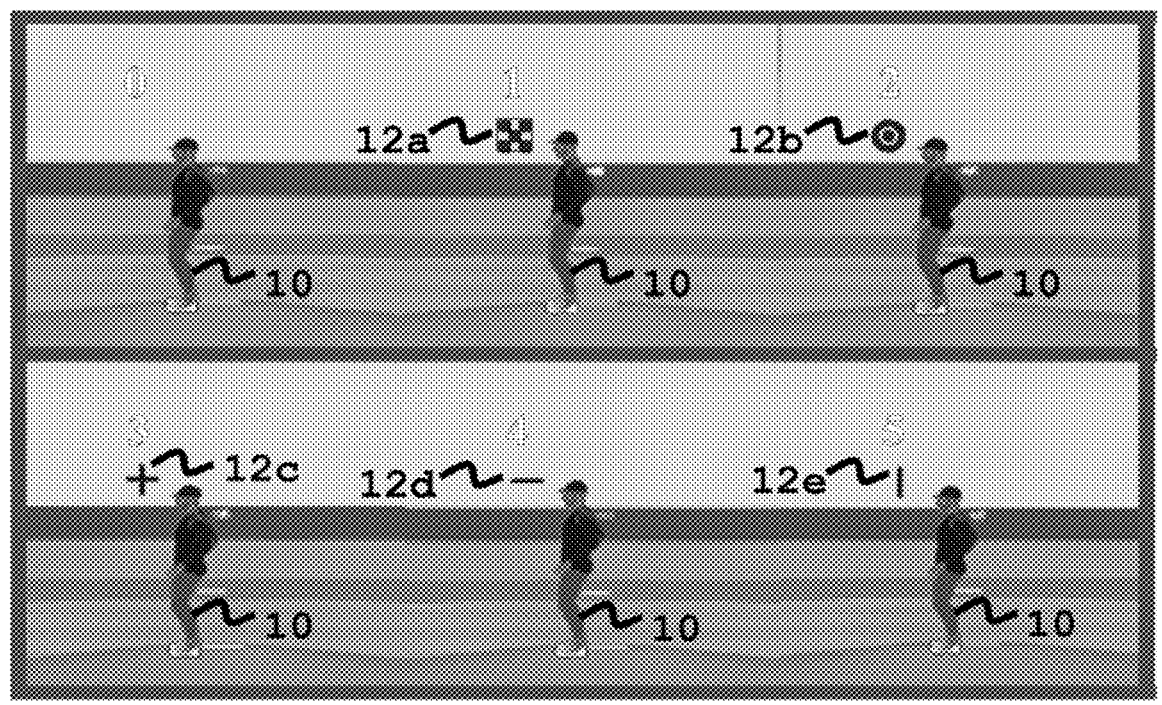
FIG. 2 illustrates the addition of pitch release zones (P-Zones) to a pitching simulation in embodiments of an augmented reality pitch simulator training system.

In embodiments of an augmented reality pitch simulator training system, various assets, referred to herein as P-Zones, T-Zones, K-Zones, and L-Zones, are added to a simulation for the training and evaluation of tracking eye movements. Examples of the Pitching Release Zone or "P-Zone" asset are illustrated in FIG. 2, which shows images of various pitching simulations with a pitcher avatar 10 in a simulated (or real) ballpark environment. The P-Zone asset 12 is placed behind the pitcher's release point. The use of this graphic added to the simulation helps the user to focus on the release point region of the pitch. The P-Zone is centered at the average release point of pitches that exist in a large data set (e.g., of 500 or more pitches). With respect to the illustration of FIG. 2, starting at the top left, images for 6 different simulations (labeled 0 to 5) are shown, including: (0) no P-Zone; (1) checker board P-Zone 12a; (2) a bull's eye P-Zone 12b; (3) a cross P-Zone 12c; (4) a horizontal line P-Zone 12d; and (5) a vertical line P-Zone 12e.

Figure 3:
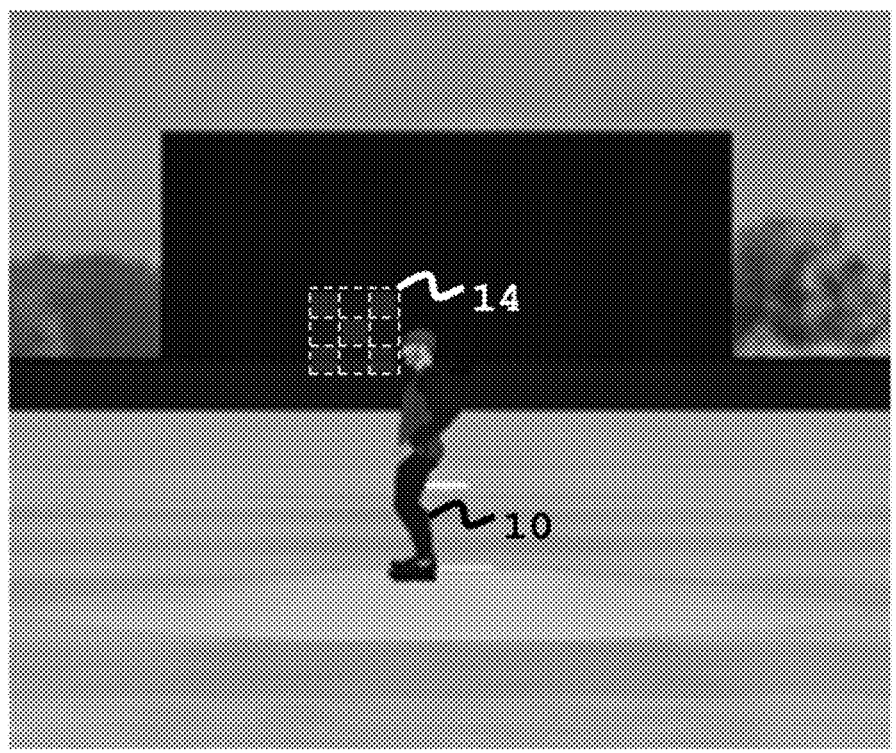
FIG. 3 illustrates the addition of a tunnel zone (T-Zone) to a pitching simulation in embodiments of an augmented reality pitch simulator training system.

Tunnel Zone or "T-Zone" is an asset that lies halfway between the pitcher and home plate in a pitching simulation. These zones are semi-transparent so that the hitter's view is not affected in any way as the ball travels from the pitcher to home plate. This is another visual tool for the player to use when learning how to differentiate between different types of pitches. An example of the T-Zone asset 14 is shown in FIG. 3, which shows an image of a pitching simulation with a pitcher avatar 10 in a simulated (or real) ballpark environment. In embodiments, when a simulated pitched ball is presented in the T-Zone asset 14, the laces on the pitched ball asset are turned from red to black so as to enhance the contrast of the ball as it moves through the T-Zone asset 14.

Figure 4:
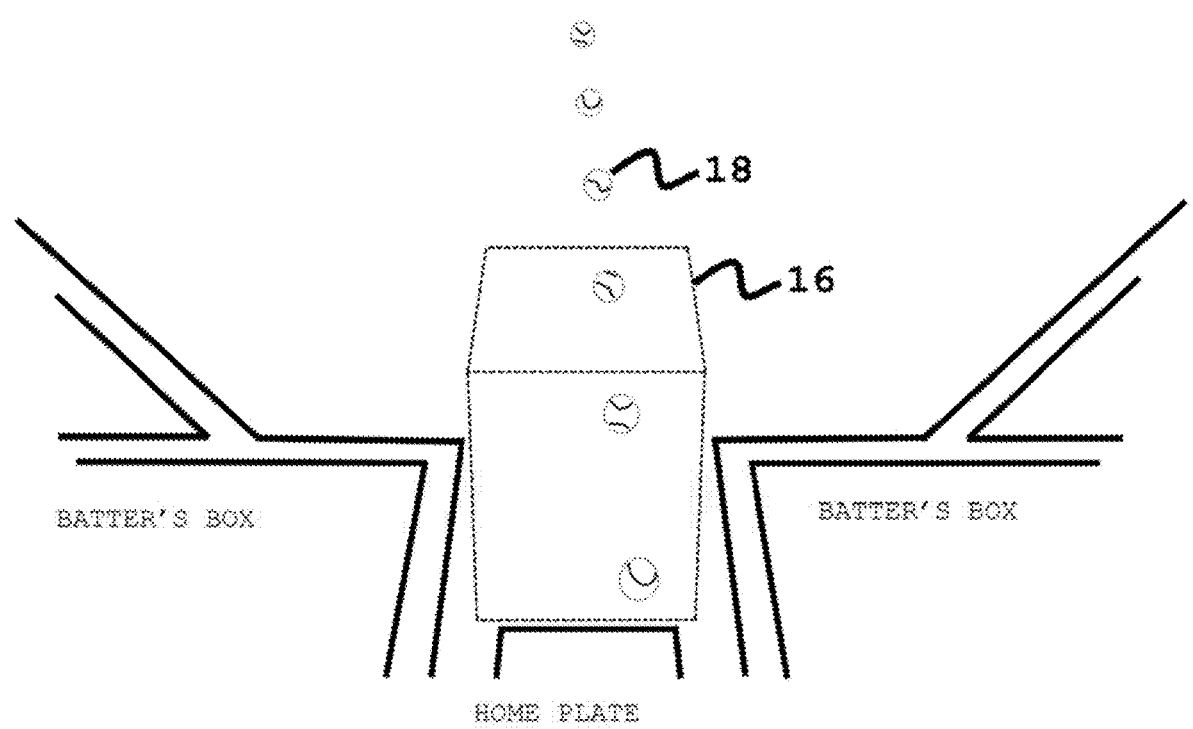
FIG. 4 illustrates the addition of a strike zone (K-Zone) to a pitching simulation in embodiments of an augmented reality pitch simulator training system.

In embodiments of Strike Zone or "K-Zone" training and evaluation exercises, a user defined K-Zone graphic 16, shown in FIG. 4, is seen before and after the pitch. The height of the bottom to the top of the strike zone is defined in the settings of the extended realm simulator by having the user provide these values in inches. In one particular K-Zone training and evaluation exercise, the pitch travels for a certain duration of time set by the user, stops momentarily, then disappears, and finally reappears a second (or other defined time) later at the front of home plate. Before the pitch reappears at home plate, the player must say ball or strike and/or what type of pitch it is. In one embodiment, the user's response is recorded through a system microphone and then automatically scored for correctness by the computer when compared to the actual ball or strike and/or pitch type event. Software for receiving and interpreting verbal information in interactive systems is known. In other embodiments, the user's response and the system event (e.g., ball or strike and/or pitch type) are manually entered via an appropriate input device, recorded into a spreadsheet on a computer and automatically scored for correctness when compared to the actual ball or strike and/or pitch type event. The user's response accuracy for predicting ball or strike and/or pitch type is recorded after scoring the result of a predetermined number of pitches (e.g., 20 pitches). At the end of the exercise, the position and orientation of the ball as a function of time appears along with a graphic showing the actual user's strike zone and text indicating whether the pitch is called a ball or strike, the pitch type (FF, CU, SL, etc.), and the initial velocity of the pitch. This is depicted in FIG. 4 (except for the text). The K-Zone graphic 16 is shown inserted into the simulation over the virtual home plate after the pitch crosses home plate along with the pitched ball's path 18 over time after it reappears in the simulation. A staircase adaptive training approach is also implemented here where the initial nominal viewing time of the pitch after release is 0.175 seconds. Increases or decreases of 0.05 seconds in the viewing time of the ball after pitch release will occur as negative or positive responses in the training result, respectively. Ultimately, the nominal recognition time between 0.075 and 0.275 seconds is determined for each user for each pitch type.

Figure 5A:
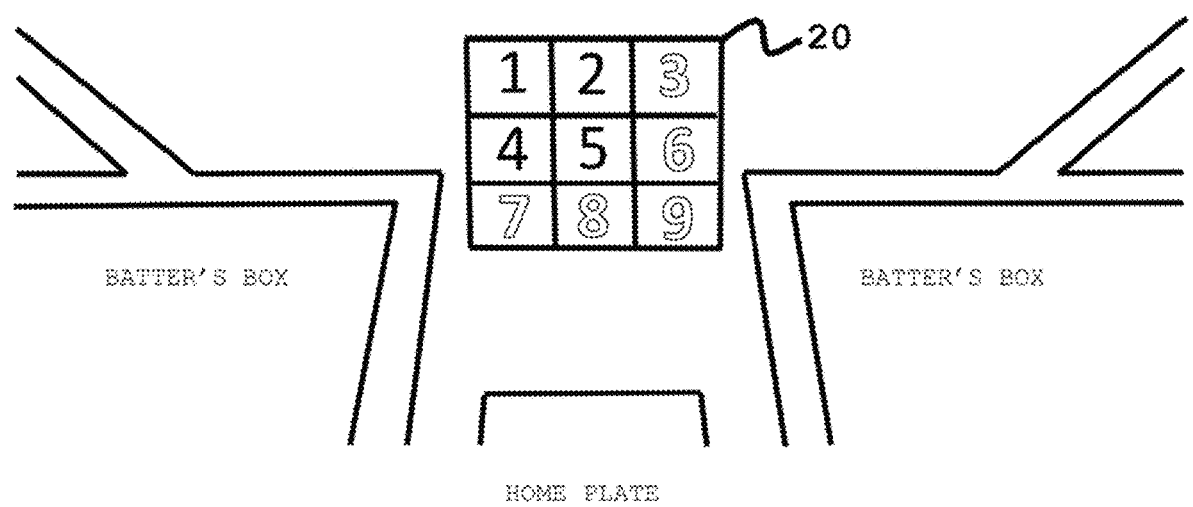
FIGS. 5A and 5B illustrate the addition of a location zone (L-Zone) to a pitching simulation in embodiments of an augmented reality pitch simulator training system.
Figure 5B:
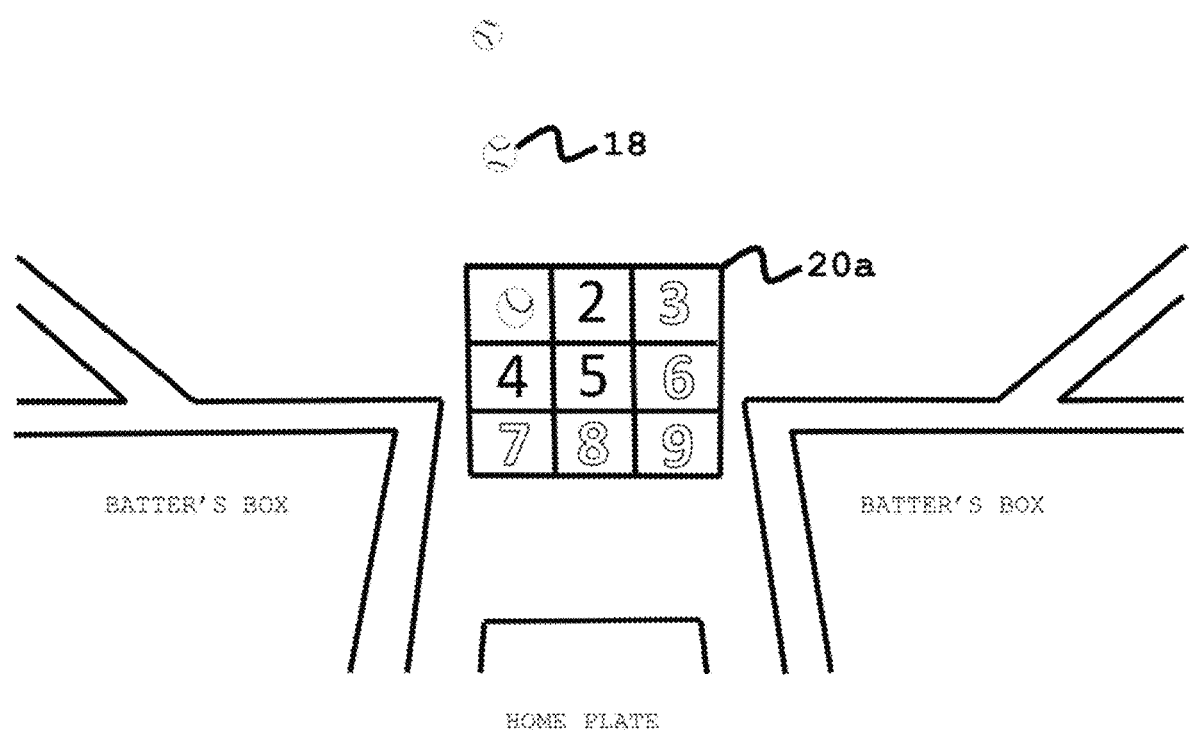

The Location Zones or "L-Zone" asset is illustrated in FIGS. 5A and 5B. In embodiments, the L-Zone is 3×3 grid numbered 1-9 corresponding to locations within the strike zone where a pitch could pass over the front of home plate. At the start of a training exercise, the user selects two or more of the L-Zones. The thrown pitch during the simulation will pass through one of the selected zones. FIG. 5A shows the L-Zone graphic 20 added to the pitching simulation with zones 1, 2, 4 and 5 being selected the user. This selection is illustrated by color coding, cross-hatch or some other manner of visually indicating the selection. The L-Zone graphic 20 then disappears as the pitcher (not shown) begins his motion. Before the pitch arrives at home plate, the player must say which one of the L-Zones the ball will pass through. In one embodiment, the user's response is recorded through a system microphone (in the manner discussed above) and then automatically scored for correctness by the computer when compared to the actual numbered L-Zone which the pitched ball passes through. In other embodiments, the user's response and the system event (e.g., L-Zone number) are manually entered via an appropriate input device, recorded into a spreadsheet on a computer and automatically scored for correctness when compared to the actual numbered L-Zone which the pitched ball passes through. The user's response accuracy for predicting the correct L-Zone number is recorded after scoring the result of a predetermined number of pitches (e.g. 20 pitches). After the pitch crosses home plate, as illustrated in FIG. 5B, the L-Zone graphic 20a along with the path 18 of the ball appears, illustrating which L-Zone the ball passed through along with text indicating the pitch type (FF, CU, SL, etc.), and the initial velocity of the pitch (not shown in the figure). As with other embodiments, a staircase adaptive training approach is implemented where initially only two adjacent zones are selected at the start of the training exercise. The number of L-Zones is eventually increased to four adjacent zones, and finally to all nine L-Zones upon the result of positive training responses.

Dynamic Visual Assets

Figure 6:
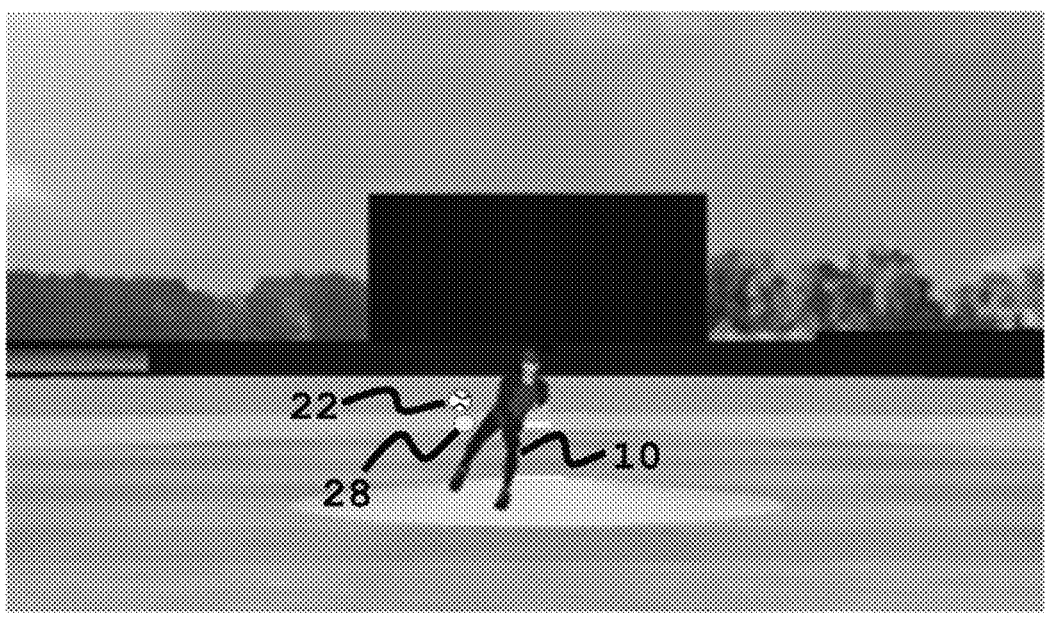
FIG. 6 illustrates a ghost ball asset embodiment where a semi-transparent white ball leads the actual pitched ball along the path of the pitch in embodiments of an augmented reality pitch simulator training system.

In addition to or as an alternative to the use of soundscapes to train a user's anticipation or recognition of an object's trajectory, dynamic visual assets can also be used separately or in tandem with other sensory stimuli to assist the user in producing the correct tracking eye movements while training. In embodiments, ghost images (semi-transparent images) of the object to be tracked by the user can be made to appear ahead of the object along the object's path so as to properly lead the eyes along the correct trajectory. FIG. 6 illustrates a ghost ball asset embodiment where a semi-transparent white ball 28 leads the actual pitched ball 22 along the path of the pitch. In an example of combining sensory stimuli, a soundscape is used in tandem with a ghost object in the augmented reality pitch simulator training system embodiment. If the soundscape starts 0.1 seconds before the release of the pitch, then at the release time of the pitch, the ghost image appears 0.1 seconds ahead of the pitched ball along the pitch's path so as to lead the tracking eye movements. The use of sound and visuals can help reinforce the desired end-result of producing the correct smooth eye pursuit by creating the correct eye velocity and trajectory while tracking the pitch.

Figure 7:
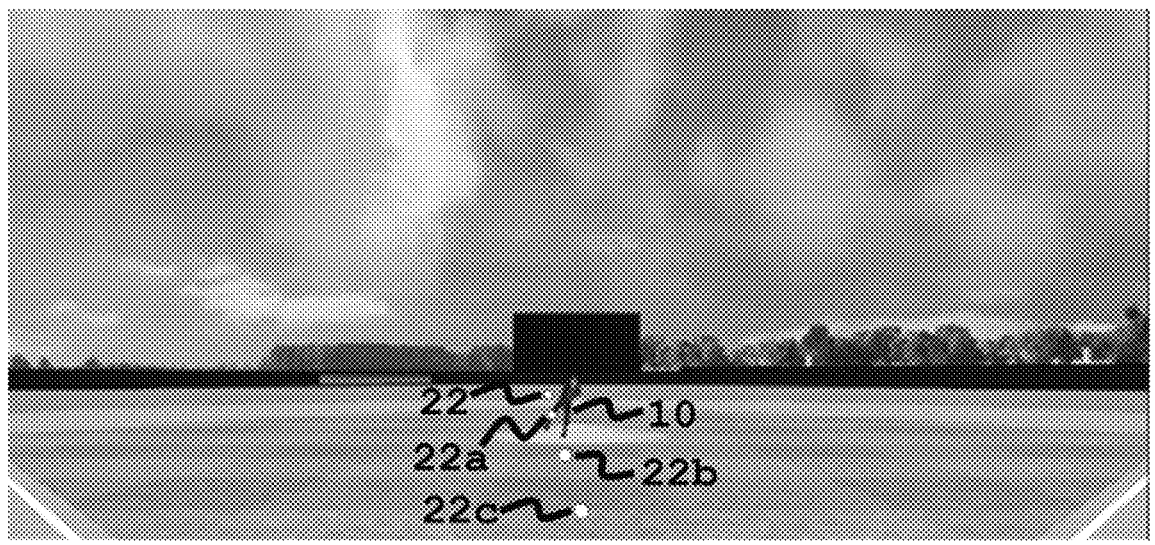
FIG. 7 illustrates the addition to a pitching simulation of pulse width modulation transparency of a baseball in embodiments of an augmented reality pitch simulator system.

In various embodiments, pulse width modulated transparency (PWMT) of the tracked object in motion is incorporated in the extended realm. Periodically, the object is fully opaque for a duration of 20 milliseconds and then disappears (fully transparent) for intervals of either 40, 60, 80, 100, or 120 milliseconds, where the duty cycle (the ratio of the time of opaqueness to the total period, where the total period is the sum of the opaque time and the transparent time) is decreasing. Even objects with intermittent transparency (50% duty cycles) are possible, where the times of opaqueness and transparency are the same, such as times of 60, 80, 100, 120 milliseconds. An illustration of the PWMT of a baseball is shown in FIG. 7. Specifically, FIG. 7 shows the path of the simulated ball over time and varying between opaqueness and transparency over time. That is, the ball is visible when first pitched as ball 22 and then disappears (for a defined period of time) until it is visible again as ball 22a that is closer to home plate for a defined period of time. The ball then disappears again for a defined period of time until it is again visible again as ball 22b for a defined period of time. This process continues (e.g., see ball 22b) until the ball crosses home plate. While FIG. 7 shows multiple instances of ball 22 along its flight path visible in the simulation over time, it should be understood that this is merely for illustrative purposes. That is, once a ball disappears it is not shown in the simulation at that position, i.e., in embodiments, only one ball is shown in the simulation at any given time, e.g., when the ball has progressed to instance 22c, instances 22, 22a, and 22b are not shown on the simulation screen. For a given extended realm trainer, the times of opaqueness and transparency can be adjusted depending on the frame rate of the system. The PWMT training approach is similar in concept to training with stroboscopic glasses, however here, only the appearance of the object is occluded and not the background. The use of this periodic appearance and disappearance of only the object in a non-occluded background allows for a more natural training approach of smooth eye pursuit where the user's vision is neither totally nor partially occluded for some duration of time. Studies have shown that distinct eye movement patterns that minimized eye position error produced smooth tracking and inhibited reverse eye saccades were related to dynamic visual acuity. In this embodiment, the player's eyes are trained to produce smooth tracking methods while inhibiting reverse saccades as the ball travels from the pitcher's hand to home plate since the player's eyes will always be "looking forward" to see the intermittent appearance of the ball as the ball approaches home plate. In embodiments, PWMT training can also be combined with soundscapes in smooth pursuit training exercises.

Figure 8:
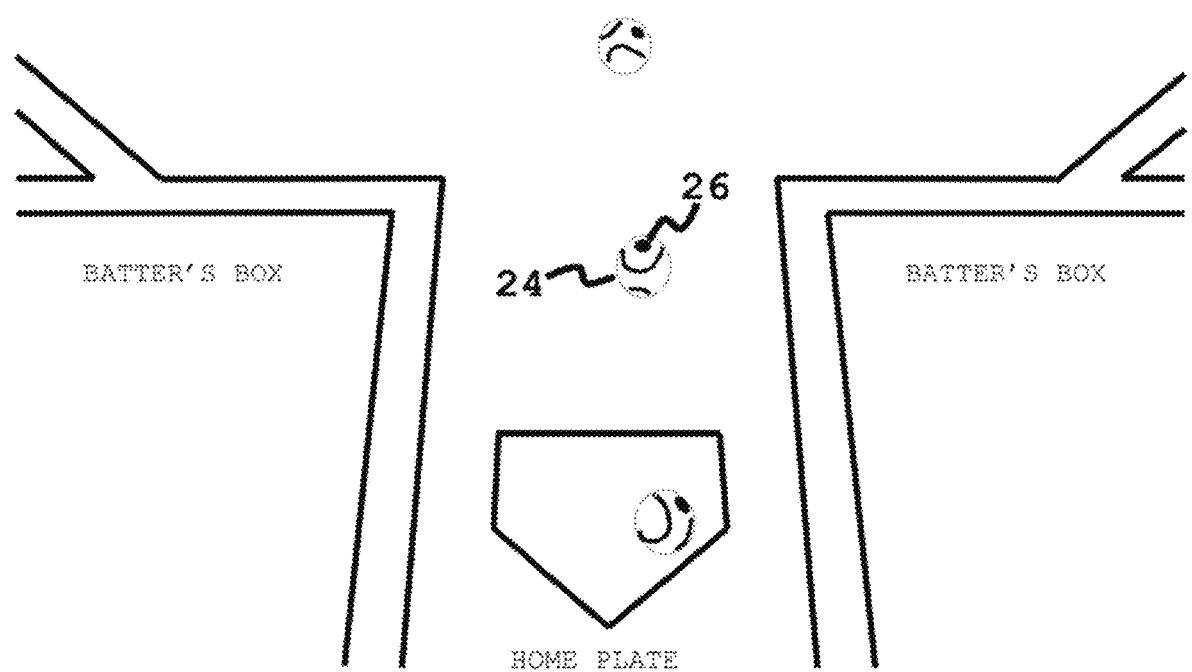
FIG. 8 illustrates the addition to a pitching simulation of a baseball having colored markers added to the virtual baseball.

In embodiments, for the evaluation of smooth eye pursuit training, colored markers, such as color filled circles, are added on the tracked object. In embodiments, two different color palettes of red, orange, green, and blue are used along with the color black. The one color palette, where the red color is a RGB value of [155, 70, 27], the orange color is a RGB value of [194, 120, 32], the green color is a RGB value of [123, 161, 111], and the blue color is a RGB value of [28, 142, 158], works for those with most types of color blindness where the user will be able to differentiate between these colors. The other color palette, where the red color is a RGB value of [255, 0, 0], the orange color is a RGB value of [255, 165, 0], the green color is a RGB value of [0, 255, 0], and the blue color is a RGB value of [0, 0, 255], is for users who do not have issues with color differentiation. For example, in the augmented reality pitch simulator training system embodiment, black laced baseballs 24 with two one-inch diameter or larger colored circles 26 on opposite sides of the ball are utilized as shown in FIG. 8. It should be appreciated that FIG. 8 shows the path of the ball 24 over time. For color scheme used in the cases where color differentiation is an issue, these colors tend to be more muted (not as bright) so a black outline around the colored circles is added so as to enhance the contrast since a pitched ball is both moving and spinning fast.

Tactile Stimuli for Training and Feedback

In embodiments, tactile or haptic stimulators (for example, transducers) are employed on a user's body during training to assist the user in creating the correct temporal response to some event in the extended realm simulator. These haptic or tactile stimulators can be strapped onto a variety of body locations. Applications that include somatosensory and other types of tactile sensory tests are possible. In one embodiment of augmented reality pitch simulator training system, a stimulator is strapped to the front foot of a hitter, and a stimulator is strapped to the bottom hand on a bat which would be held by a hitter (e.g., to the left hand for a right-handed hitter). At the time when the ball is released, the front foot is stimulated so as to provide feedback to the hitter as to when to start his stride. At the time when the baseball reaches the front edge of the plate, the bottom hand is stimulated to represent the time in which the bottom hand would feel the impact of a batted ball as a baseball is crossing home plate. Consequently, the user feels the timing of the body mechanics to produce a bat swing through the use of these stimulators. Also, the stimulators provide the user the time interval over which proper tracking eye movements need to occur. In embodiments, tactile transducers are built into the bat to provide feedback to the user. Such feedback from a bat could even be used to provide a user an indication as to the quality of the impact between a bat and ball in an extended realm hitting simulator. Other configurations of tactile transducers on the body are possible along with other varieties of training exercises which can be devised. Many of the micro vibration motors that are commercially available and already used in cell phones, game controllers, restaurant call units, etc. can be used to implement the tactile transducers. Similar to the use and construction of wireless restaurant call units, a micro vibration motor is interfaced to a microcontroller and is triggered by the microcontroller when the microcontroller receives a wireless signal (e.g., Bluetooth® signal) from the simulation computer to start a haptic stimulation event.

Eye Tracking and Biofeedback Sensing

In embodiments, infrared eye trackers are built into digital eyeglasses or head-mounted displays (HMDs) and are used to give the normalized 2D coordinates on a display in which the eyes are fixated, as a function of time. These normalized 2D coordinates are stored in the user's metrics files. The user's head motion (position and orientation) is also tracked with sensors in the eyeglasses or HMD and stored in the user's metrics files to provide a complete model of the user's head and eye motions while tracking an object. The 2D velocity and the trajectory of the user's eyes are ascertained as the eyes track an object moving across the 2D display as a function of time. If the vertical direction is termed the Y direction and the horizontal direction is termed the X direction, then the vertical velocity of each eye is given as the relative change in the Y coordinates of each eye divided by the relative change in time between the data points (inverse of the eye tracker IR camera frame rate) and the horizontal velocity of each eye is given as the relative change in the X coordinates of each eye divided by the relative change in time between the data points. The trajectory or slope of each 2D eye path is calculated as the relative change in Y divided by the relative change in X. Consequently, the vertical and horizontal velocities of each eye and the trajectory of each eye are captured by the system as a function of time between the start of the pitch and until the ball crosses home plate. Once the traveling object's normalized 2D coordinates on the simulation display are determined as a function of the user's head orientation during the pitch simulation time (from release to crossing home plate), the object's 2D velocity and trajectory are determined through the same approaches used to calculate the eyes' 2D velocity and trajectory as a function of time. The traveling object's normalized 2D coordinates on the simulation display are determined by mapping the object's 3D coordinate in the extended realm to a 2D display coordinate. For example, WorldViz of Santa Barbara, Calif. provides a VR development platform for researchers under the name VIZARD™ Within this platform, the <window>.worldToScreen command can be used to convert a 3D coordinate of the tracked object in the extended realm to a 2D screen coordinate. Metrics are then used to determine the likelihood that smooth pursuit of the eyes is occurring while the user is tracking the motion of an object in the simulator. For example, three measurements are performed, and techniques described in the literature on eye tracking are applied to determine the likelihood that smooth pursuit of the eyes is occurring while the ball is traveling from pitch release to home plate. The three measurements are the following: (1) the number of reverse saccades in both the vertical and horizontal directions for each eye are determined from the number of sign changes in the vertical and horizontal eye velocities; (2) the angular velocities (degrees per second) in both the horizontal and vertical directions for each eye are calculated using the geometry of the display system relative to each eye position and the 2D linear velocities of each eye; (3) the user's 2D eye velocity and trajectory are compared with the object's 2D velocity and trajectory by calculating the absolute differences between the eyes' and object's vertical and horizontal velocities and by calculating the absolute differences between the eyes' and object's trajectories. From these three measurements, smooth eye pursuit occurs when (1) reverse eye saccades are inhibited; (2) angular eye velocities are in the range of approximately 115-150°/s; and (3) measured absolute differences in the velocities and trajectories are small. Thereby, the tracking eye movements match the velocity of the target being tracked and follow the projected path of the object. In addition to infrared eye tracking systems, a three sensor EOG (electrooculography) system can be built into the eyeglasses or HMD that places three electric potential sensors on the lower forehead of the user so as to provide additional and complementary data to the eye tracking data provided by the infrared camera technique.

Figure 22:
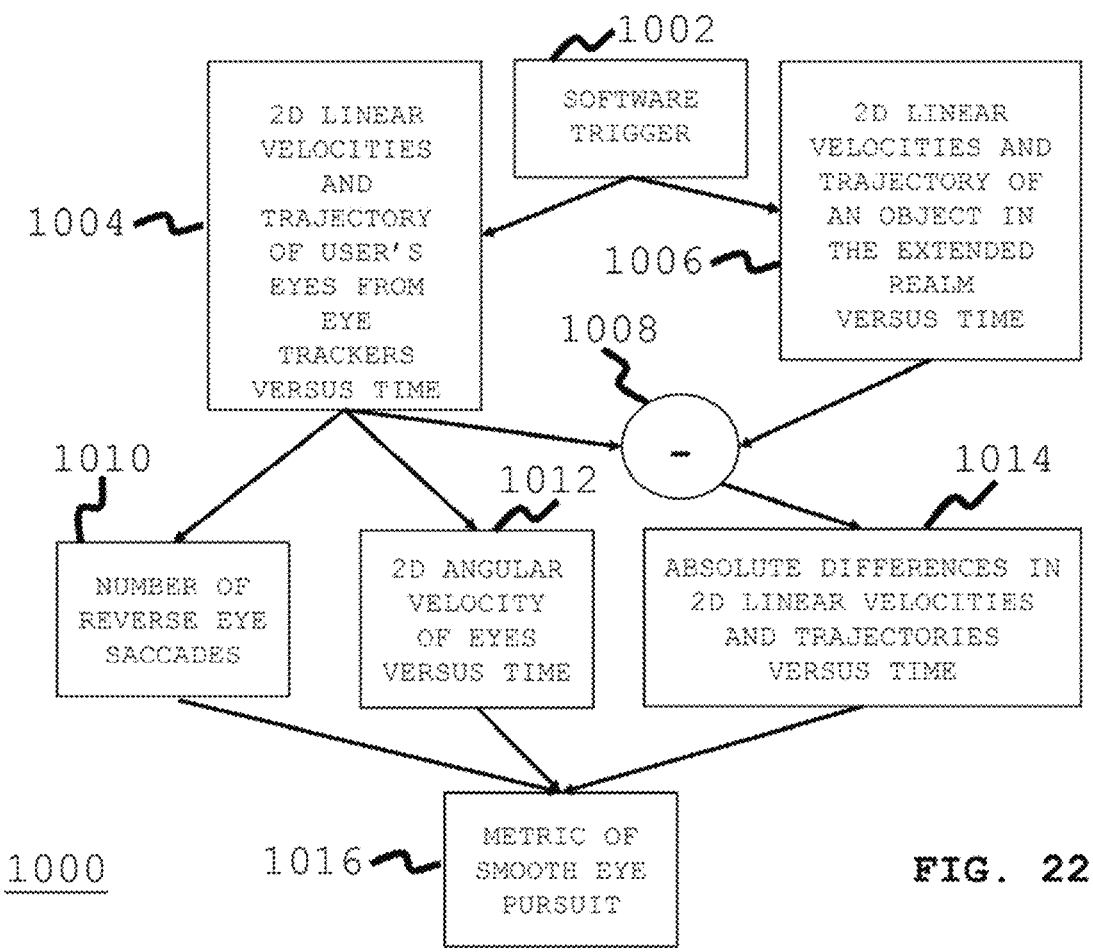
FIG. 22 illustrates a method of gauging the tracking eye movements performance of a user in accordance with certain embodiments.

FIG. 22 shows a method 1000 of gauging the tracking eye movement performance of a user. At 1002, a trigger signal in the simulation starts the positional data capture of the eye tracking system versus time. The trigger occurs when the pitcher avatar releases the pitched ball in the simulation. At 1004, data for the 2D velocity and trajectory of user's eyes is obtained from the eye trackers. At 1006, data for the 2D velocity and trajectory of a traveling object in the extended realm is obtained. At 1008, a subtraction operation is performed on both sets of 2D linear velocity data and trajectory data. At 1010, the number of reverse saccades from the eye tracker velocity data is determined while the object is traveling and then stored in the user's metrics database. At 1012, the angular velocity of the eyes from the eye tracker data is determined while the object is traveling and then stored in the user's metrics database. At 1014, the magnitude or absolute value of the subtraction operation on the data is calculated versus time and stored in the user's metrics database to determine how well the 2D linear velocity data sets and trajectory data sets correlate. At 1016, metrics in the literature are utilized when analyzing the measured data at 1010, 1012, and 1014 so as to ascertain how likely smooth eye pursuit has occurred.

Current neurofeedback technology, such as EEG (electroencephalography) that measures one's level of focus or concentration through the analysis of alpha, beta, and theta brain signals, is utilized so that the degree of an individual's concentration level during training can be ascertained and optimized. In embodiments, EEG sensors are built into the digital eyeglasses or HMDs. The user's level of concentration can be used to control the simulation where the object's motion does not start until a certain level of user concentration is achieved. Thereby, training the user to achieve an optimal focus level before tracking an object.

In embodiments, EMG (electromyography) sensors are built into the digital eyeglasses or HMDs. Muscle tension in the skull is measured via an electrical voltage signal originating from the nerves controlling the muscles. As muscle contraction increases, the electrical activity in the nerves increases, resulting in a larger magnitude in the EMG signal. Consequently, the user's stress level can be monitored in measuring the user's muscle tension in the skull muscles, such as those muscles around the jaw and forehead. In the extended realm, audio along with other distractions and game situation pressures are also added to the simulation so as to try to affect a user's stress level. In embodiments, the user's stress level is used to control the simulation where the object's motion does not start until a user's stress level lies below a certain threshold level, which trains the user to achieve an optimal relaxation level before tracking an object. The combination of EEG and EMG sensing in an extend realm headset will allow for both optimal focus and relaxation levels to be achieved. A single EEG/EMG neurofeedback sensor with grounding points behind the user's ears is employed in the embodiment of the HMD. A current commercial version of this described EEG/EMG system exists in a pair of digital eyeglasses available from Narbis of Ambler, Pa.

Figure 14:
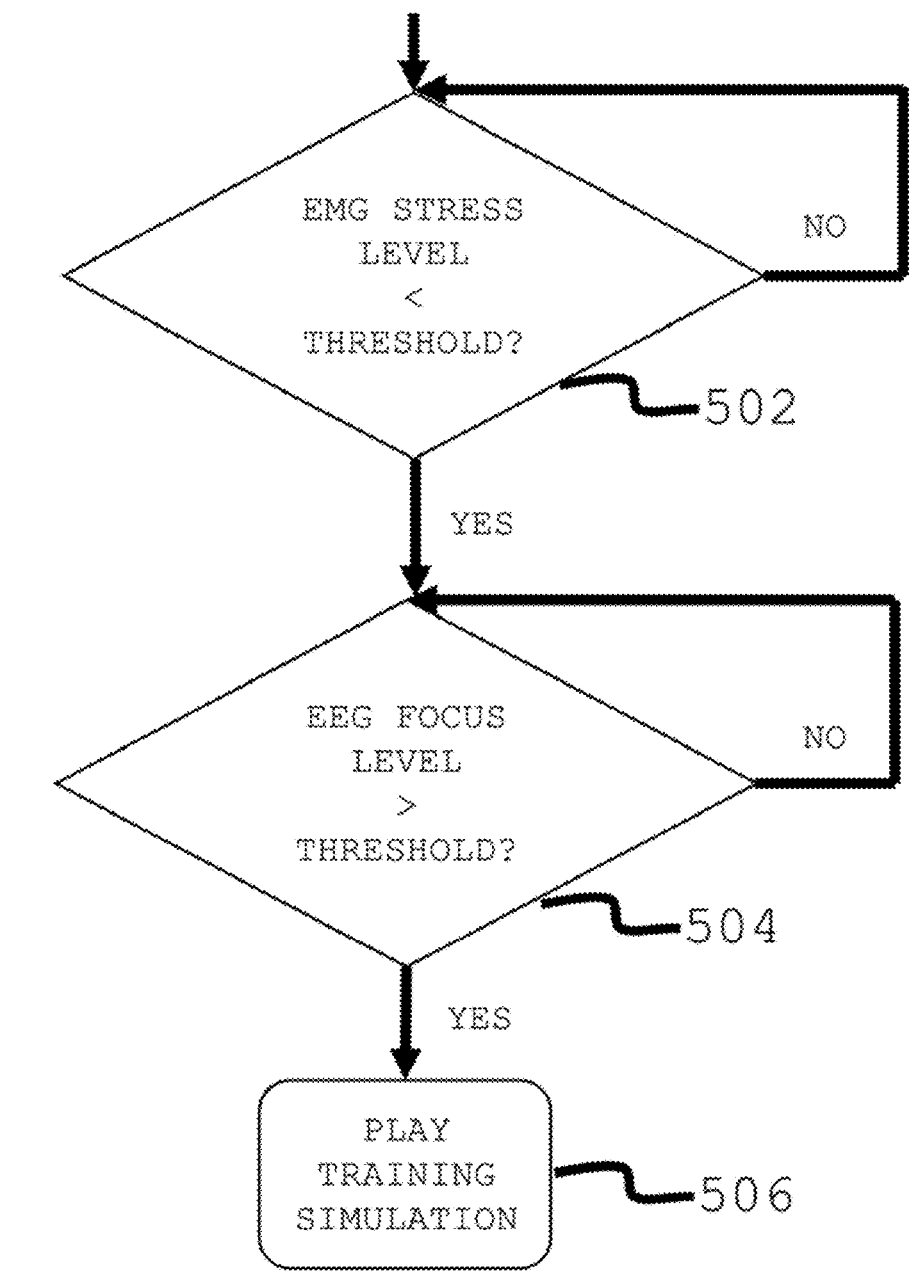
FIG. 14 illustrates a method for controlling a pitch simulation dependent on the focus and relaxation levels of a user in accordance with embodiment of an augmented reality pitch simulator training system.

FIG. 14 illustrates a method 500 for controlling a pitch simulation dependent on the focus and relaxation levels of a user in accordance with embodiment of an augmented reality pitch simulator training system. Specifically, in accordance with the method 500, the pitching avatar will not start his mechanics until both the focus and relaxation levels of the user reach acceptable levels relative to certain levels. For example, at step 502, it is determined whether the EMG stress level is below a threshold. At step 504 it is determined whether the EEG focus level is above a threshold. If both conditions of steps 502 and 504 are met, then the training simulation is allowed to begin, for example the virtual pitch is thrown in step 506.

Use of Assets in the Extended Realm to Provide an Accurate Training Experience

In embodiments of the augmented reality pitch simulator training system, right-handed and left-handed pitching avatars with accurate mechanics common of many professional level pitchers are assembled and auto-rigged using software such as the FUSE™ desktop application and MIXAMO™ animation software available from Adobe of San Jose, Calif. and then animated through the use of 3D character animation software such as using keyframes in the MOTION BUILDER™ software available from Autodesk Inc. of San Rafael, Calif. Using online available video and photographs, the typical pitching mechanics of dominant and durable pitchers may be used to model the mechanics of the pitching avatar in the extended realm. The pitcher's front leg lift, back leg-drive off the pitching rubber, hip rotation around to front foot plant, hip-to-shoulder separation at front foot plant, backward arm swing, arm angle and arm speed at ball release, torso rotation and tilt, and pitching grips are all accurately portrayed. In embodiments, the virtual pitcher always releases the pitched ball at a distance of 55 feet from the tip of home plate. In embodiments, the vertical and horizontal release points of the pitched ball do vary. In embodiments, the average pitch release location is determined from a 500 pitch database. The initial position and sizing of the avatar is created such that the pitcher's hand position matches exactly with the position of the average release point of the pitched ball. As the ball's release point changes relative to this average release point, an algorithm in the extended realm simulator simultaneously adjusts the horizontal position of the avatar along the pitching rubber and scales up or down the avatar by a few percent in both the horizontal and vertical directions so that the pitcher's hand matches up with the ball's release point to less than a quarter-inch. With the same scaling factor used in scaling the avatar in both the horizontal and vertical directions, any change in the size of the avatar is not noticeable by the user since it is done proportionately.

In embodiments of the augmented reality pitch simulator training system, twenty different data sets of 500 pitches each are used in the training, where ten of these are thrown by a right-handed avatar and ten of these are thrown by a left-handed avatar. Each data set is composed of four different pitches, fast ball, curve ball, slider, and change-up, which are most commonly thrown by pitchers at any level. However, any type of pitch can be rendered in practice besides these that are noted. For example, in embodiments fast balls from 75 MPH to 120 MPH are possible. Fast balls in the first data set are 75 to 80 MPH and vary in increments of ~1 MPH, fast balls in the second data set are 80 to 85 MPH and vary in increments of ~1 MPH, etc. In the extended realm simulator, pitch types can be selected either randomly or the same pitch type can be repeated over and over. Pitch locations can also be selected by choosing any location (ball or strike), only strikes, or specific regions within the strike zone, or a mix of balls and strikes and zones. Thereby, any combination of pitch speeds, pitch types, and pitch locations can be generated within any of these twenty different 500 pitch data sets. In embodiments, a staircase adaptive training approach is implemented where performance-based adjustments of pitch speed, pitch type, and location are employed so as to make the training level optimal for each user since the task difficulty is appropriately matched to the user's skill level.

Evaluation of Specific Skills after Vision Training

In embodiments of the augmented reality pitch simulator training system, there are three extensions of the system directed towards umpires, catchers and hitters.

Umpire Embodiment

In an embodiment directed towards training an umpire, assets such as a catcher avatar and a hitter avatar are added to the pitching simulation to provide a realistic setting for an umpire. Metrics are used to evaluate the performance of an umpire after training with augmented reality pitch simulator training system. For example, in embodiments one metric is to evaluate the user on the accuracy of calling balls and strikes. In these embodiments, the user would press a button on the system controller (or use some other manner of inputting a selection) to indicate the user's choice of ball or strike after a pitch has been thrown. A K-Zone graphic appears after the choice has been made illustrating whether the call was correct or not. An example of another metric would be a graphic illustrating the regions of the strike zone where the user's accuracy was the worst and the type of pitches in these zones that were most often miscalled.

Catcher Embodiment

Figure 15:
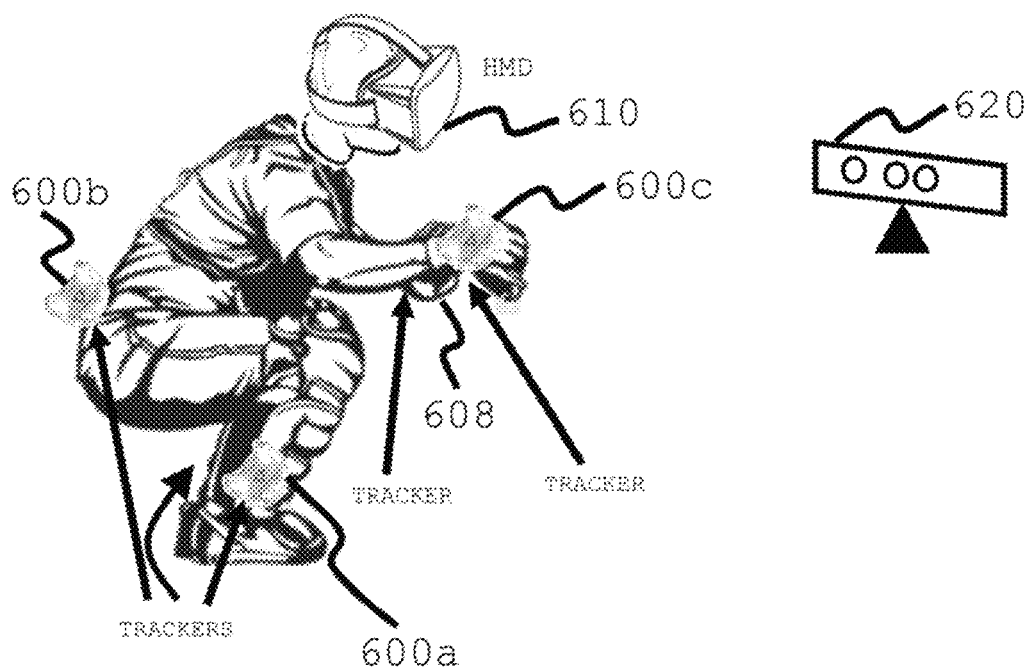
FIGS. 15 and 16 illustrate aspects of a system for use in training a catcher in an augmented reality simulator training system.
Figure 16:
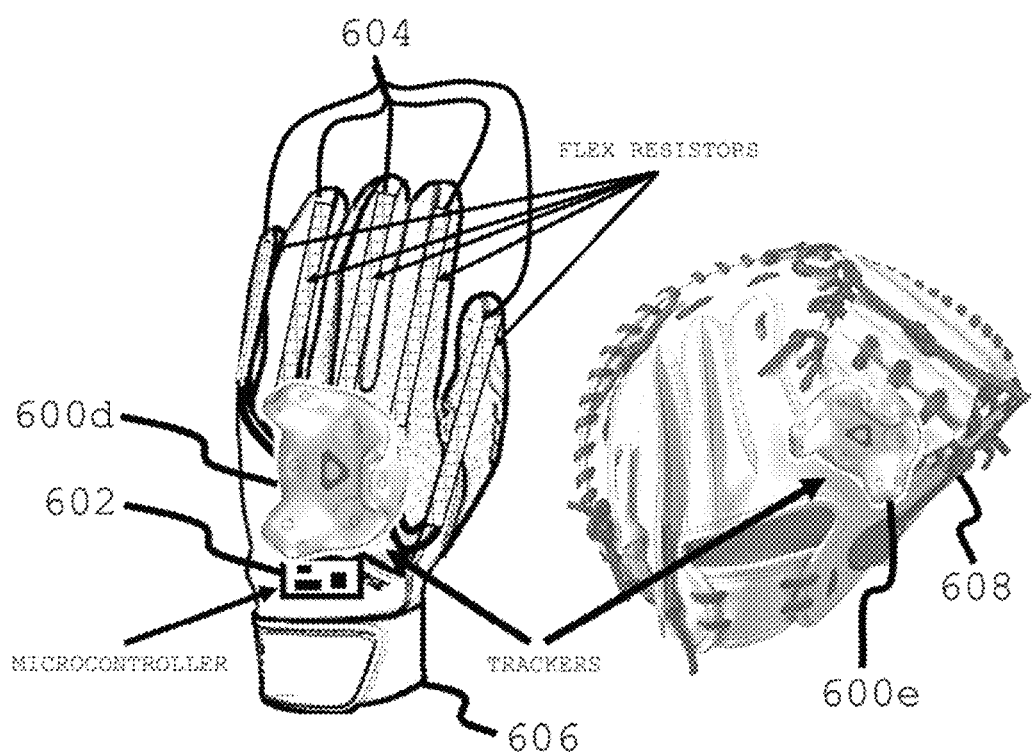

Metrics can be used to evaluate the performance of a catcher after training with augmented reality pitch simulator training system. One example of a commercially available system is the HTC VIVE PRO™ system which includes the VIVE PRO™ VR HMD headset along with version 2.0 base stations and controllers available from HTC Corp. of Taiwan. Five HTC trackers (e.g., version 2018) 600 from the system are placed on the user's body at positions illustrated in FIG. 15 and the tracker of the HMD headset 610 is also utilized. The bones of a rigged catcher avatar in the extended realm are mapped to these tracker locations such that the user gets a greater sense of presence in the extended realm since the avatar moves with the user. Two trackers 600a are strapped (or otherwise attached) below the calf muscles on the side of the user's right and left legs, one tracker 600b is strapped on the user's back around the waist, another tracker 600c is strapped to the non-catching hand, and the fifth tracker 600d is attached to the back of a fitted glove 606 that the user wears on his catching hand as illustrated in FIG. 16. In embodiments, flex sensors 604 whose resistance varies with bending are attached to the fingers of this glove 606 and interfaced to a microcontroller 602 on the back of the glove 606. Through the "pogo pins" interface on the tracker 600d, signals from the microcontroller 602 monitoring the flex sensors 604 are read by the virtual reality system (e.g., HTC VIVE PRO™ system) to ascertain when the user would virtually catch an object in the extended realm. A catcher's mitt is seen in the extended realm, and the mitt moves and flexes as the user's hand changes position and as the user moves his fingers. In another embodiment, the fifth tracker (shown as tracker 600e) is mounted to the back of an actual catcher's mitt 608 on the pocket of the mitt 608 as illustrated in FIG. 16. Thereby, as the catcher's mitt 608 is closed the tracker rotates about one of its axes to ascertain if the user virtually caught an object in the extended realm. Through the use of the trackers 600 on the user's body, the motion and position of the user is mapped to the motion and position of an avatar in the extended realm in real time. A catcher's mitt is seen in the extended realm, and the mitt moves and flexes as the user's hand changes position and as the user moves his fingers. In another embodiment, a KINECT$^{360}$™ IR camera system 620 in FIG. 15 available from Microsoft Corp. of Redmond, Wash. is interfaced to the virtual reality computer system running the software FAAST (Flexible Action and Articulated Skeleton Toolkit) available from the University of Southern California Institute for Creative Technologies in Playa Vista, Calif. within the VIZARD™ VR development platform. FAAST is middleware to facilitate integration of full-body control with VR applications using the Microsoft KINECT for WINDOWS™ skeleton tracking software. Other configurations using IR cameras and other skeleton tracking and control software are possible. As discussed above with the HTC trackers, the bones of a rigged catcher avatar in the extended realm are mapped to the joint locations determined from the skeleton tracking software through the utilization of an IR camera system. Embodiments using a combination of HTC trackers and skeleton tracking software through the use of IR cameras are possible. Catching and blocking training and evaluation drills, specific to the catcher position in baseball or softball, are performed. In embodiments, the catcher and umpire training systems can even be combined where both a live catcher and a live umpire wearing headsets and trackers train in tandem.

Hitter Embodiment

Figure 17:
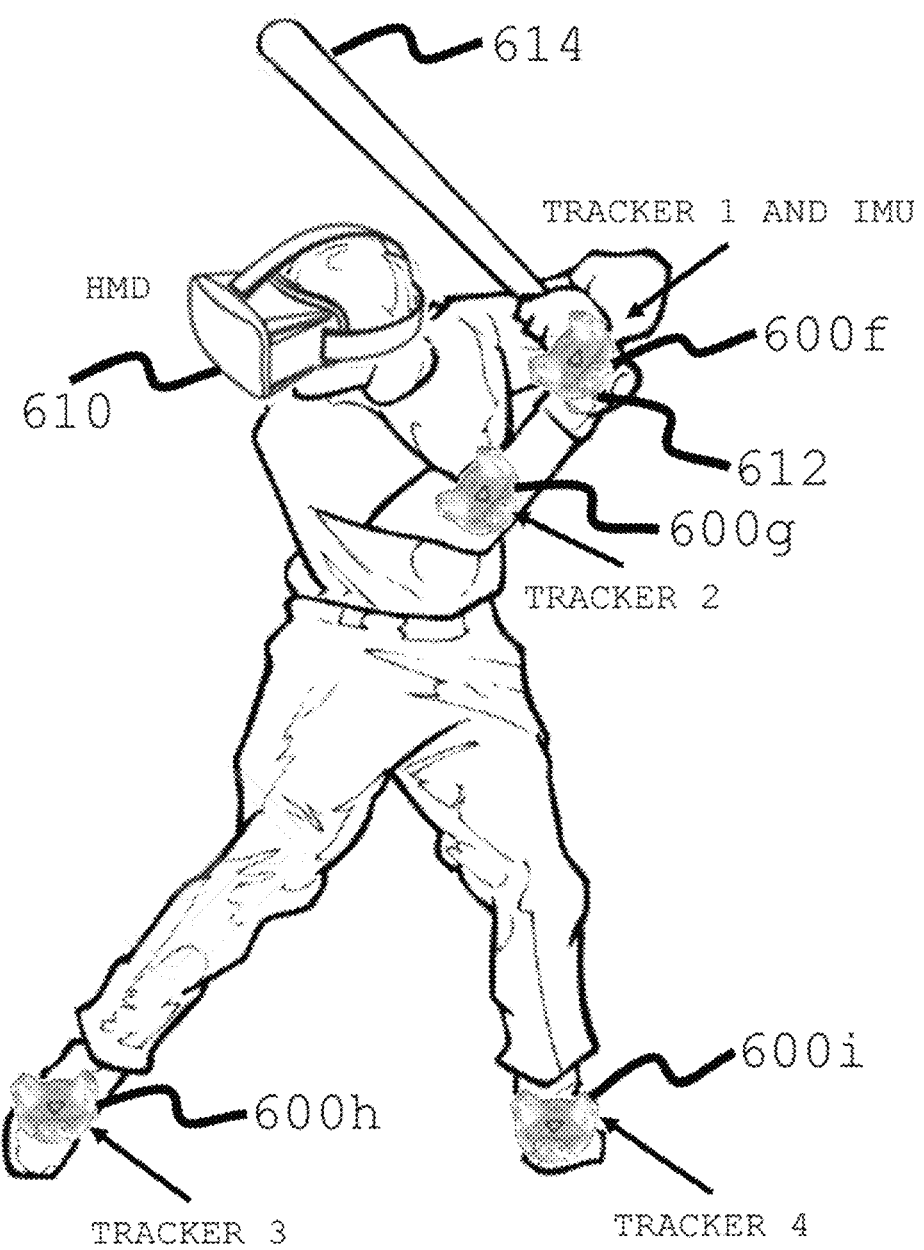
FIG. 17 illustrate aspects of a system for use in training a hitter in an augmented reality simulator training system.
Figure 24:
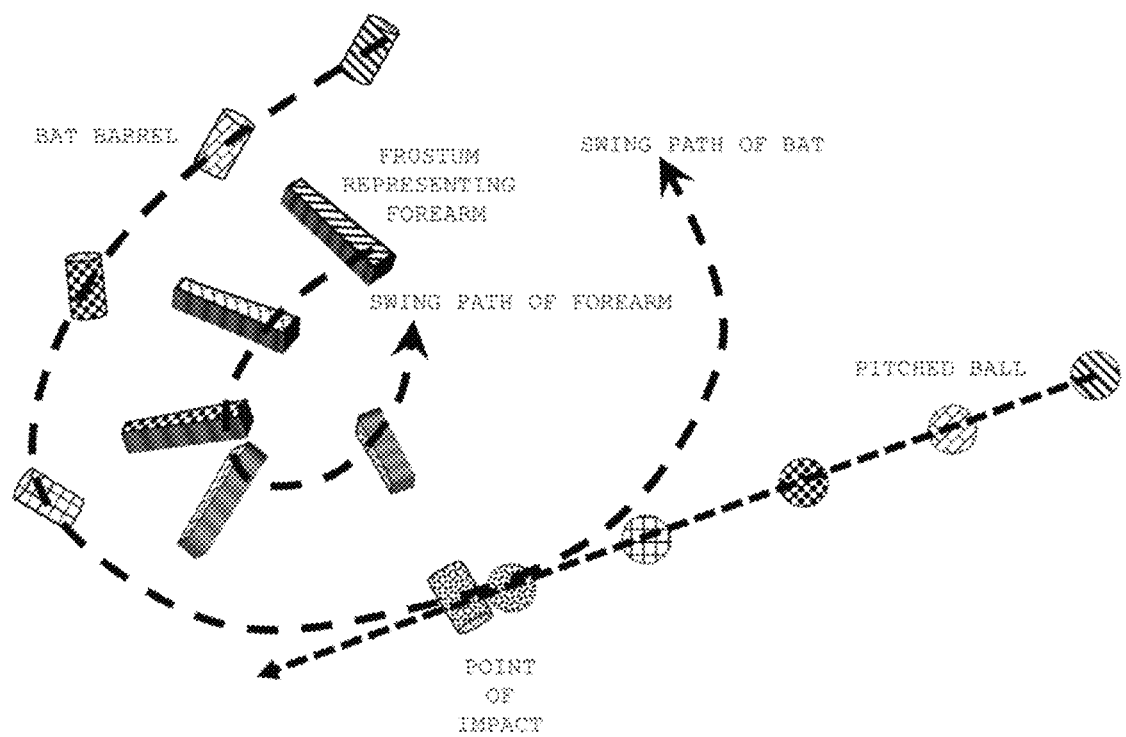
FIG. 24 illustrates the positions and orientations of the bat barrel and the user's forearm and pitched ball positions displayed in an augmented reality simulator after a user's swing.

In embodiments, metrics are used to evaluate the performance of a hitter after training with the augmented reality pitch simulator training system. Various tracking and imaging techniques through the use of cameras, RF radar (such as the WALABOT™ 3D imaging sensors available from Vayyar Imaging Ltd. of Fairfield, Ohio), trackers for use with headset systems like the HTC VIVE PRO™ system with version 2.0 base stations, inertial measurement units (IMUs), and others can be employed in capturing the motions of a user's body and objects utilized by the user during training. As described in connection with the catcher embodiment, the bones of a rigged hitting avatar in the extended realm are mapped to the joint locations of the user through the use of various tracking and imaging techniques. In one embodiment, such as described above that uses the HTC VIVE PRO™ system, four or more trackers are placed on the user's body and the tracker of the HMD headset 610 is also utilized to record the hitter's head motion while hitting. The position of the trackers 600f, 600g, 600h, 600i on the batter's body are also shown in FIG. 17, but other locations for the trackers on the body, bat, etc. are also possible. The position of tracker 1 (600f), which is attached to the batter's glove, is used to determine the position and orientation of the real bat and the virtual bat seen in the extended realm on the HMD headset. An inertial measurement unit (IMU) (not shown), attached to either the batter's glove 612 or to the knob of the bat 614, provides direct measurements of the bat's acceleration and angular velocity. One example of a commercially available IMU is the MetaMotionR™ Bluetooth device available from Mbientlab Inc. of San Francisco, Calif. This device reads motion values up to 800 times a second. Tracker 2 (600g), which is attached to a Velcro strap on the batter's upper forearm, provides the position and orientation of the real and virtual forearm of the batter. The positions and orientations of the batter's forearm and bat barrel are captured as a function of time while a real bat is swung attempting to hit the virtually pitched ball. In the extend realm after the pitch has been completed, color coded right circular conic frustums representing the batter's forearm appear displaying the position and orientation of the user's forearm during the bat swing at ~10 millisecond time intervals. Color coded right circular cylinders of 6-inch lengths and 2⅝-inch diameters representing the bat barrel appear displaying the position and orientation of the user's bat barrel during the bat swing at ~10 millisecond intervals. Finally, color coded three-inch diameter spheres representing the thrown ball also appear displaying the position of the thrown ball during the bat swing at ~10 millisecond intervals. An illustration demonstrating the position and orientation of the batter's forearm and bat barrel and the position of the ball every ~40 milliseconds until the time of impact between the ball and bat is shown in FIG. 24. Consequently, in the extended realm, the hitter can directly see his bat's swing plane as a function of time in terms of his bottom hand forearm and bat barrel orientations and positions in relation to the position of the pitched ball as a function of time. If a certain colored bat barrel appears near the same colored ball, then the batter knows that impact between the two objects occurred at that point in time. A double pendulum model of the forearm and bat is extracted from the measured data and stored in the user's metrics database. A Kalman filter utilizes the data provided by both Tracker 1 (600f) and the IMU so as to provide accurate results of the bat's position and orientation, velocity, and acceleration as a function of time.

Various metrics on the bat barrel are determined, such as the following (but not limited to): (1) swing plane's angle of ascent in degrees as the bat approaches the ball; (2) the difference in degrees between the pitched ball's angle of descent and the swing plane's angle of ascent; (3) bat barrel impact occurrence rate recorded as a percentage where the occurrence of impact is only recorded when the virtual ball makes contact with a 6 inch region around the bat's "sweet spot" on the barrel; (4) swing time until impact; and (5) velocity, acceleration, and possibly jerk (rate of change of acceleration) at or near the impact zone between the real bat and the virtual ball.

Figure 18:
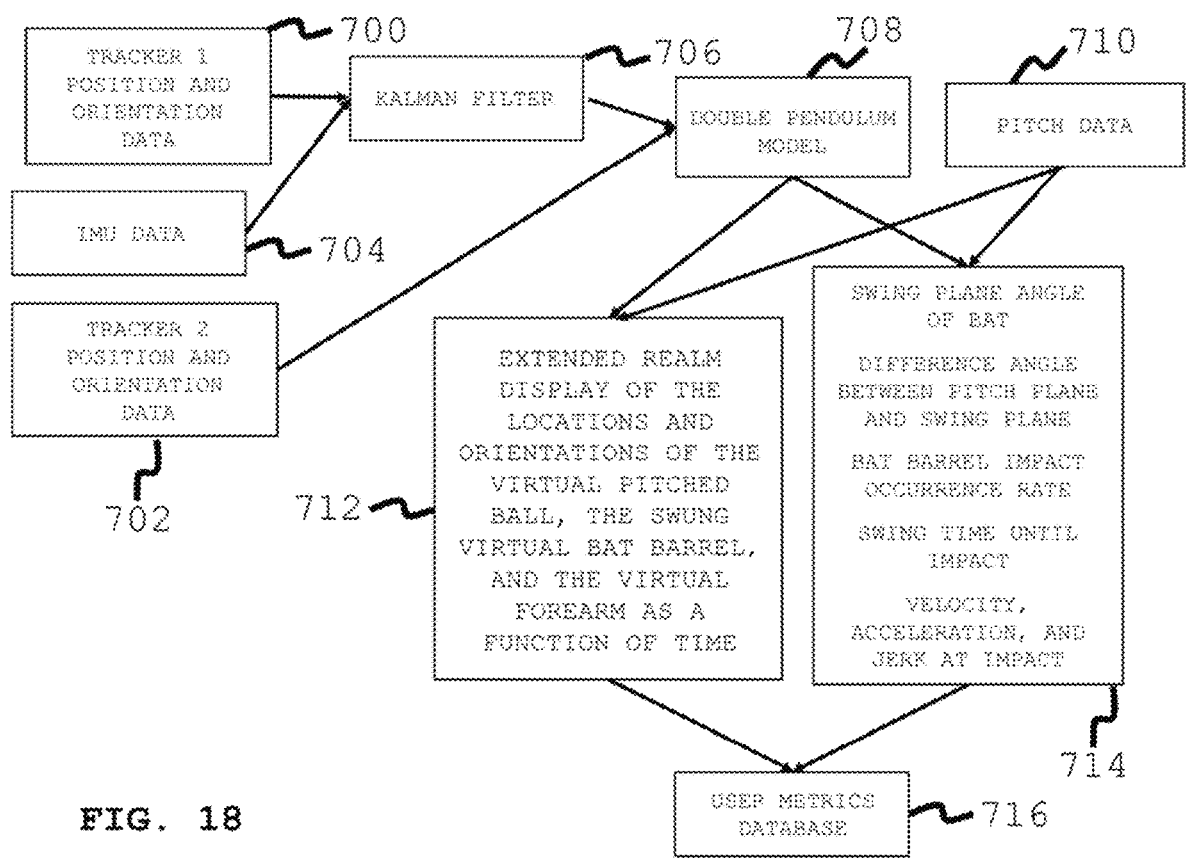
FIG. 18 shows a block diagram of a hitter configuration of an augmented reality simulator training system for measuring upper body swing mechanics according to certain embodiments.

FIG. 18 shows a block diagram of a hitter configuration of the augmented reality simulator training system for measuring upper body swing mechanics according to certain embodiments. This configuration takes as inputs (at 700) position and orientation data from tracker 600*f*, (at 702) position and orientation data from tracker 600*g*, and (at 704) angular velocity and acceleration data from an IMU unit. The position and orientation data from tracker 600*f* and data from the IMU unit are provided to a Kalman filter at 706. At 708, the output of the Kalman filter (high speed, accurate position and orientation data of the bat) and the position and orientation data of the batter's forearm are combined to produce a double pendulum model of the bat swing mechanics. At 714, the output data from the double pendulum model and the virtual pitch data (obtained at 710) are used to determine various metrics discussed above and to populate a user metrics database at 716. The output data from the double pendulum model and the virtual pitch data are used at 712 to populate an extended realm display of the locations and orientations of the virtual pitched ball, the swung virtual bat barrel, and the virtual user's forearm as a function of time (illustrated in FIG. 24) and to populate a user metrics database at 716.

Figure 19:
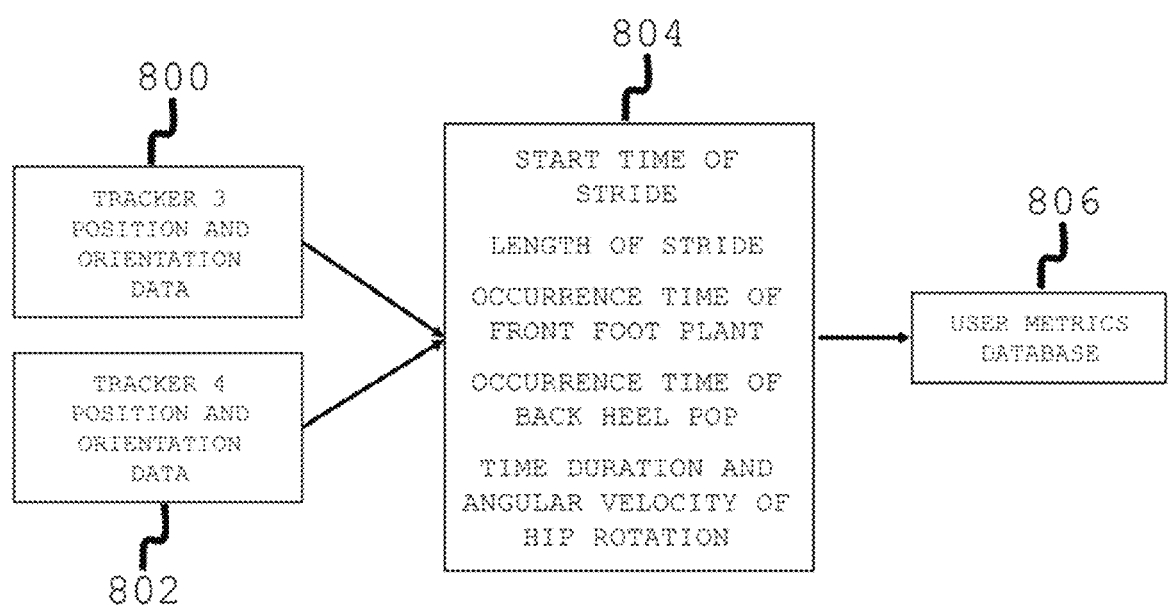
FIG. 19 shows a block diagram of a hitter configuration of the augmented reality simulator training system for measuring lower body swing mechanics according to certain embodiments.

In embodiments, to provide additional immersion of the hitter in the extended realm, trackers 600*h* and 600*i* (shown in FIG. 17) are strapped onto a batter's shoes so that the batter can see the position of his feet in the batter's box in the extended realm. By tracking the position and orientation of a batter's feet, this also allows the determination of when the batter begins his stride, the length of his stride, the time at which the front heel is planted after the stride, the time at which the back heel "pops," and the time duration and angular velocity of a batter's hip rotation. FIG. 19 is a block diagram of a hitter configuration of the augmented reality simulator training system for measuring lower body swing mechanics according to certain embodiments. This configuration takes as inputs position and orientation data (at 800) from tracker 600*h* and position and orientation data (at 802) from tracker 600*i*. The position and orientation data from both trackers 600*h*, 600*i* are used at 804 to determine, for example, (i) start time of the batter's stride, (ii) length of stride, (iii) occurrence time of front foot plant, (iv) occurrence time of back heel pop; and/or (v) time duration and angular velocity of hip rotation. This data is used to populate a user metrics database at 806.

Figure 20:
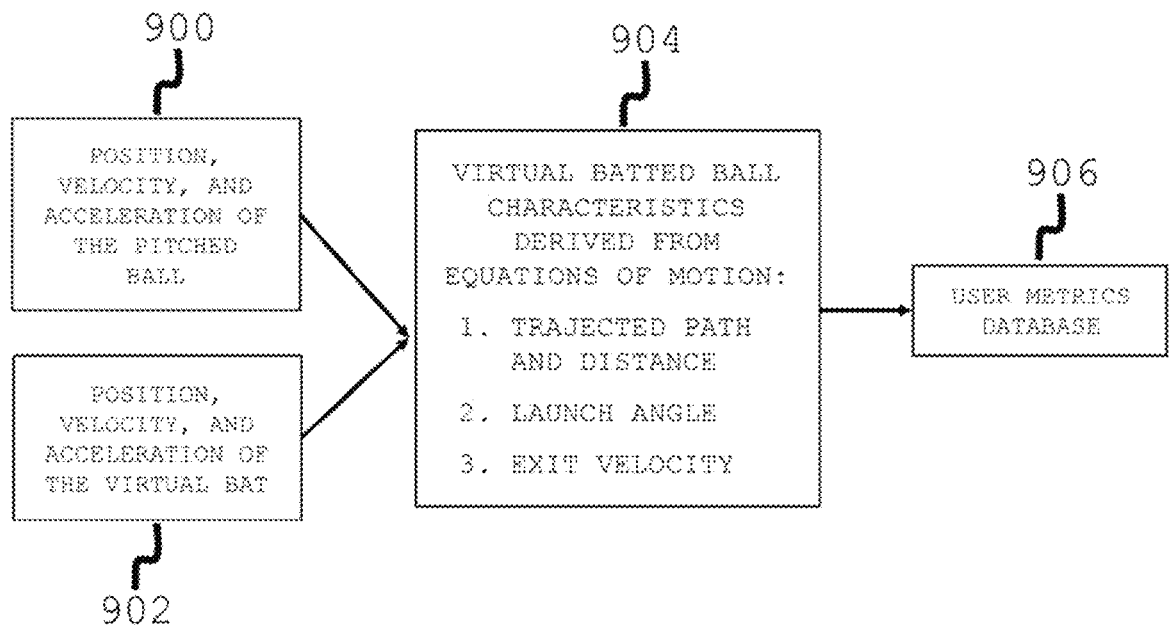
FIG. 20 is a block diagram illustrating a method used to measure the parameters of the virtual batted ball according to certain embodiments.

Using the positions, velocities, and accelerations of both the virtual pitched ball and the swung real bat, the same equations of motion along with the Simulink® model utilized in creating the virtual pitch data are used to generate the trajected path and distance, launch angle, and exit velocity of the virtual batted ball. The block diagram of FIG. 20 illustrates a method used to measure the parameters of the virtual batted ball. This configuration takes as inputs data regarding position, velocity, and acceleration of the pitched ball (at 900) and data regarding position, velocity, and acceleration of the virtual bat (at 902). These data sets are used at 904 to determine characteristics of the virtual batted ball derived from equations of motion, including the trajected path and distance, launch angle and exit velocity of the ball. This data is used to populate a user metrics database at 906.

In embodiments, all hitting metrics are stored in the user's metrics database for each swing that a batter takes. Changes in the abovementioned difference angle for various pitches, in the bat barrel impact occurrence rate for various pitches, in the bat velocity and acceleration, in the hip rotation speed, launch angles, velocities, distances of the virtual batted ball, as examples, are charted and analyzed from training session to training session to provide analytics on the hitter's mechanics.

Figure 21:
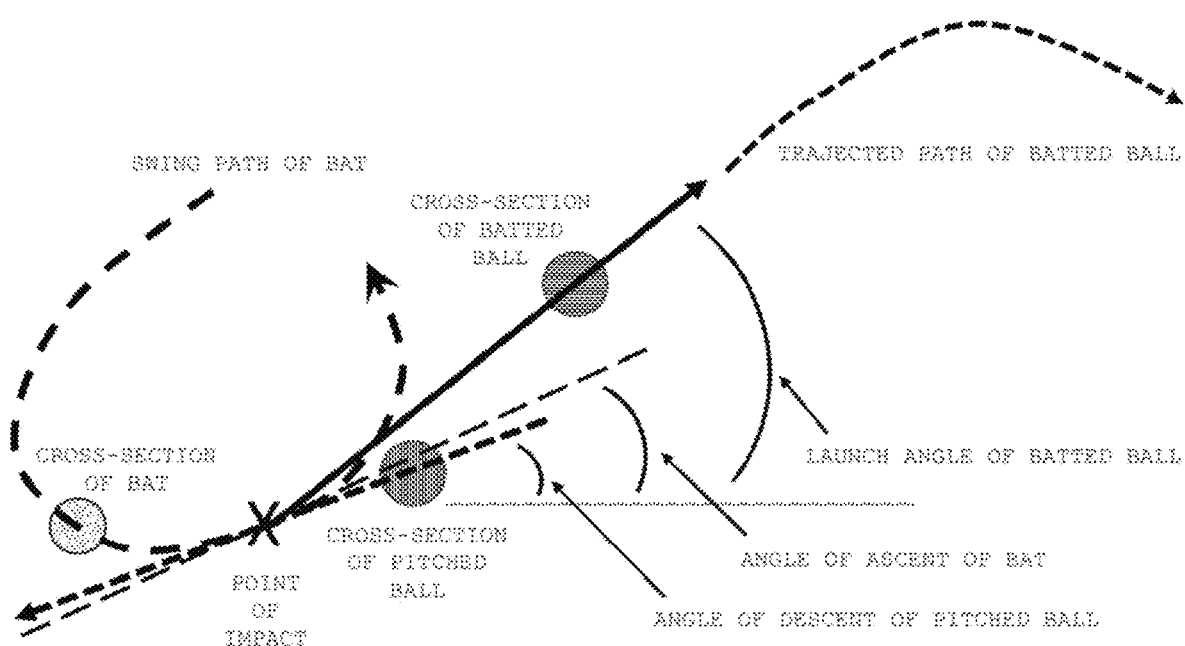
FIG. 21 illustrates the relationships between the swing path of the bat, the pitch path of the ball, and the batted ball path, along with the angles of ascent, descent, and launch.

FIG. 21 illustrates the relationships between the swing path of the bat, the pitch path of the ball, and the batted ball path. The angles of ascent, descent, and launch are also shown.

In embodiments, the abovementioned swing metrics are captured as part of staircase adaptive hitting training exercises where performance-based adjustments of pitch speed, pitch type, and location are employed so as to make the training level optimal for each user since the task difficulty is appropriately matched to the user's skill level. For example, the exercises begin by determining the nominal fastball velocity that a batter can hit reliably for pitches located in the middle of the strike zone. Once the nominal fastball velocity has been determined, the location of the fastball is varied randomly in the following manners: (1) the pitch is varied vertically (up and down) around the center of the strike zone; (2) the pitch is varied horizontally (side to side) around the center of the strike zone; (3) the pitch is varied diagonally around the center of the strike zone from the upper inside part of the strike zone to the lower outside part of the strike zone; and/or (4) the pitch is varied diagonally around the center of the strike zone from the upper outside part of the strike zone to the lower inside part of the strike zone. This exercise may be repeated for the other pitch types, for example curveball, change-up, and slider. After the completion of these hitting exercises, occlusion exercises are conducted with the hitting app trainer, such as using an effect similar to stroboscopic vision training discussed previously. Also, as stated before, soundscapes may be utilized in the batter training exercises.

Figure 11:
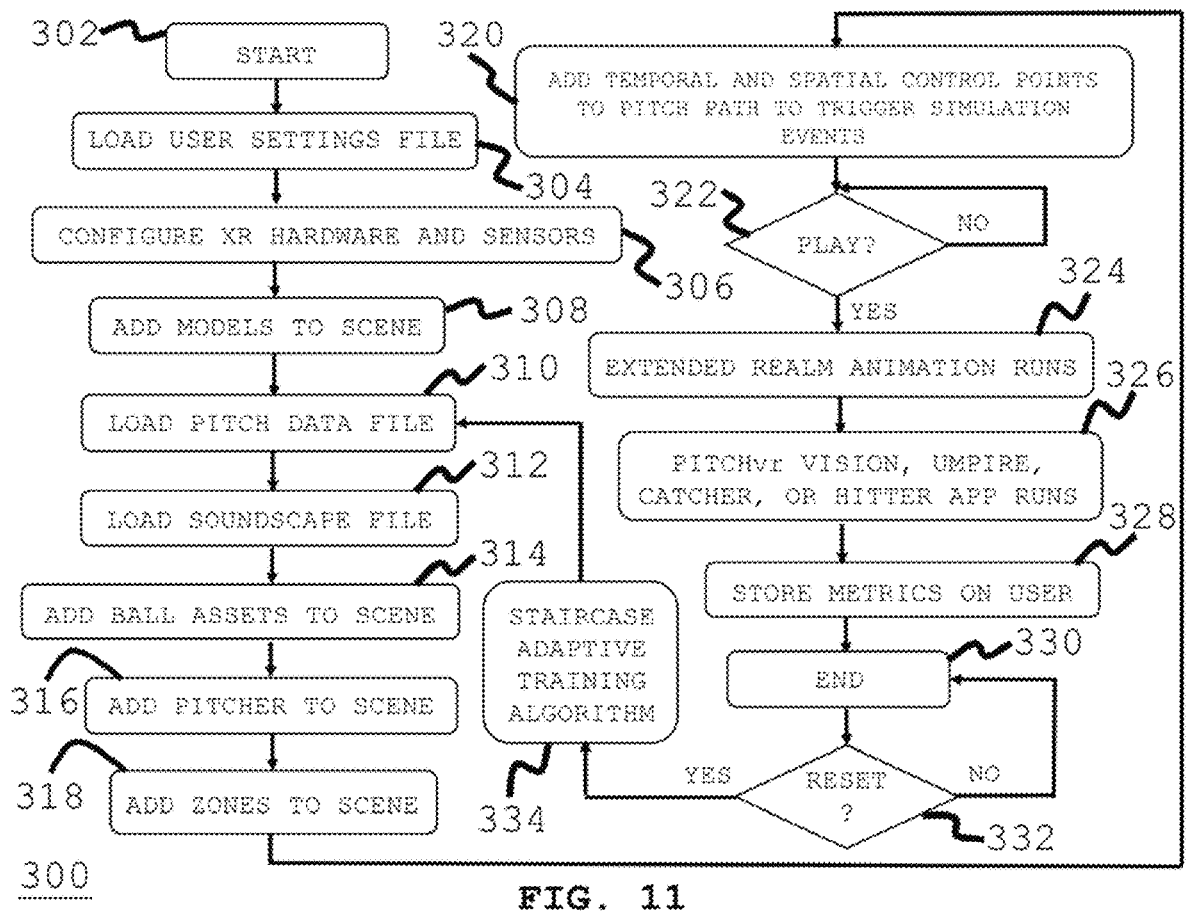
FIG. 11 illustrates a flow diagram of a method of operating an augmented reality pitch simulator system according to certain embodiments.
Figure 12:
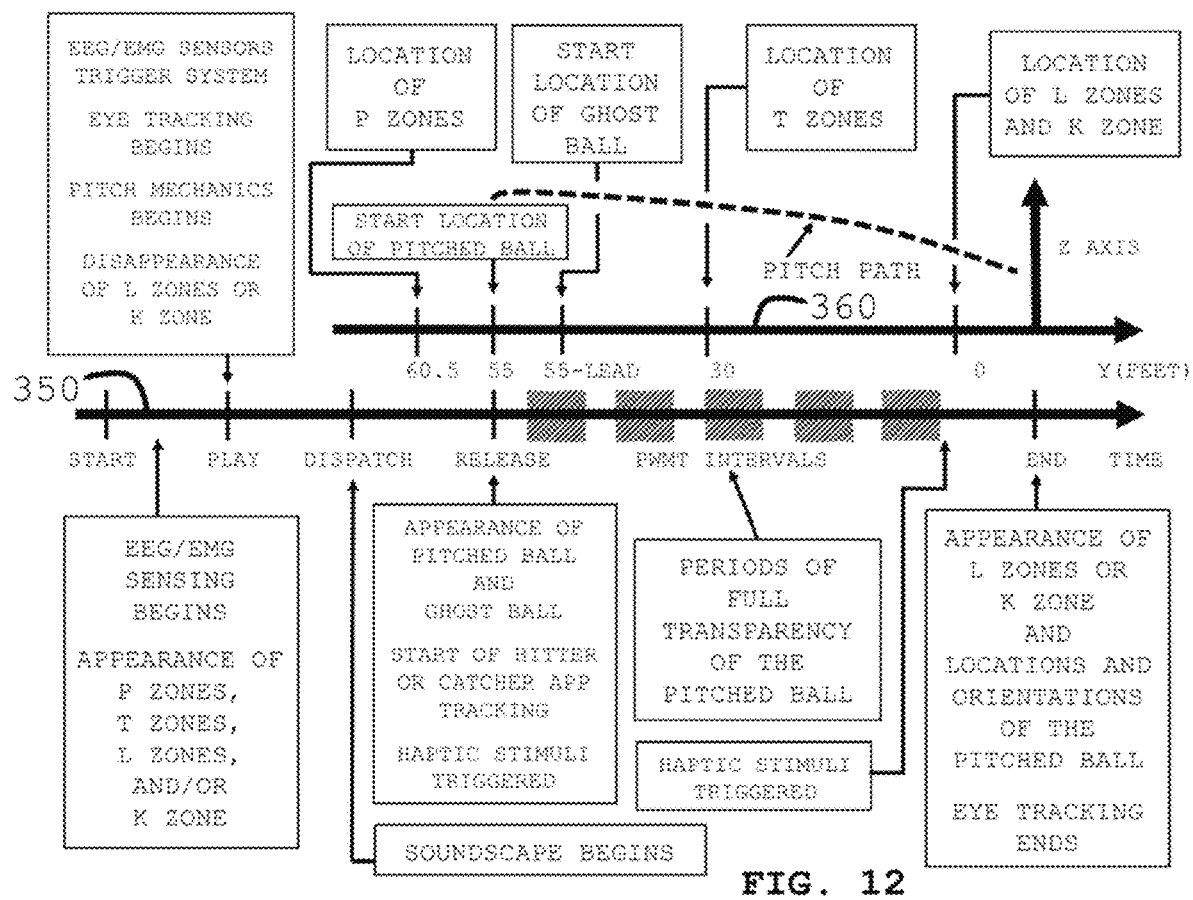
FIG. 12 illustrates spatial and temporal deployments of assets and sensors during an extended realm simulation relative to the events around and locations along the pitch path according to embodiments of an augmented reality pitch simulator training system.

FIG. 11 illustrates a method 300 of operating an augmented reality pitch simulator system according to certain embodiments. In embodiments, the method is embodied as an algorithm implemented in the Python language in the WorldViz VIZARD™ simulation environment. At 302 the method starts. At step 304 a user settings file is loaded, determining the simulation settings such as the following: (1) type of ball asset to be used, (2) whether a soundscape will be heard and the type of soundscape, (3) whether a ghost ball asset will be seen, (4) the lead time of the soundscape and ghost ball, (5) whether random types of pitch types or only specific types of pitches will be seen, (6) the handedness of pitching avatar, (7) the velocity range of the pitches, (8) the duration of the Pulse Width Modulated Transparency of the ball, and (9) which zones (P-Zone, T-Zone, L-Zone, and K-Zone) will be seen. At step 306, extended reality (XR) hardware and any sensors are configured. At step 308, models, such as the baseball field, the baseball stadium, the batter's eye, etc. are added to the virtual reality scene. At step 310, a pitch data file is loaded. At 312, a soundscape file associated with the pitch data file is loaded. At step 314, a ball asset that is thrown by the pitching avatar is added to the virtual scene along with other ball assets such as the ghost ball and the balls that appear at the end of the simulation displaying the position and orientation of the pitched ball. These ball assets are initially transparent and then appear if and when necessary in the simulation. At step 316, a virtual pitcher is added to the virtual scene. At step 318, any selected zones (e.g., P-Zone, T-Zone, K-Zone or L-Zone) are added to the virtual scene. At step 320, temporal and spatial control points are defined along the pitch path to trigger events around the motion of the pitched ball such as when eye tracking begins and ends, when the appearance and disappearance of assets such as L-Zones or K-Zones should occur, when to trigger haptic stimuli, when to trigger the playing of soundscapes and the appearance of ghost balls, etc. The occurrence of the pitch path events is illustrated in FIG. 12. At this point, the simulation is ready to begin (i.e., the pitch can be thrown once the EEG and EMG threshold levels are achieved), which is selected at step 322. At step 324, the extended realm animation runs. At step 326, either the pitch vision, umpire, catcher, or hitter application is run, according to the mode selected by the user. At step 328, metrics on the user performance are stored. At step 330, the simulation ends. At step 332, it is determined if a reset option has been selected. If the option is selected, then a staircase adaptive training algorithm can be implemented at step 334, which causes a new pitch data file to be used at step 310 dependent on the positive or negative result of the last simulation.

FIG. 12 illustrates spatial and temporal deployments of assets and sensors during an extended realm simulation relative to the events around and locations along the pitch path according to embodiments of an augmented reality pitch simulator training system. Axis 350 illustrates the operation of the system in the time domain whereas axis 360 illustrates the operation of the system in the spatial domain.

Unless specifically stated otherwise, it shall be understood that disclosure employing the terms "processing," "computing," "determining," "calculating," "acquiring," "generating," "performing" and others refer to a data processing system or other electronic device manipulating or transforming data within the device memories or controllers into other data within the system memories or registers.

One or more embodiments may be implemented in computer software firmware, hardware, digital electronic circuitry, and computer program products which may be one or more modules of computer instructions encoded on a computer readable medium for execution by or to control the operation of a data processing system. The computer readable medium may be a machine readable storage substrate, flash memory, hybrid types of memory, a memory device, a machine readable storage device, random access memory ("RAM"), read-only memory ("ROM"), a magnetic medium such as a hard-drive or floppy disk, an optical medium such as a CD-ROM or a DVR, or in combination for example. A computer readable medium may reside in or within a single computer program product such as a CD, a hard-drive, or computer system, or may reside within different computer program products within a system or network. The computer readable medium can store software programs that are executable by the processor and may include operating systems, applications, and related program code. The machine readable non-transitory medium storing executable program instructions which, when loaded into and executed by a machine, such as a computer, the machine becomes an apparatus for practicing the methods described herein. When applicable, the ordering of the various steps described herein may be changed, combined into composite steps, or separated into sub-steps to provide the features described herein.

Computer programs such as a program, software, software application, code, or script may be written in any computer programming language including conventional technologies, object-oriented technologies, interpreted or compiled languages, and can be a module, component, or function. Computer programs may be executed in one or more processors or computer systems.

It may be emphasized that the above-described embodiments, are merely possible examples of implementations, and merely set forth a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

While various embodiments have been described, it is to be understood that the embodiments described are illustrative only and that the scope of the subject matter is to be accorded a full range of equivalents, many variations and modifications naturally occurring to those of skill in the art from a perusal hereof.

What is claimed is:

1. A non-transitory computer-readable storage media comprising instructions that when executed by a processor cause the processor to:
   cause display of a simulated environment having one or more virtual objects of a sporting event;
   cause display to a user of a moving object in the simulated environment in accordance with object path data representing an object path and conditions of motion of the moving object as a function of time, wherein the moving object is displayed as moving in a direction toward the user;
   correlate soundscape data to the object path data, the soundscape data being dependent on both the object path and the conditions of motion of the moving object; and
   cause sound to be output to the user based on the correlated soundscape data either before or during displaying to the user the moving object, thereby providing spatial auditory clues for assisting tracking eye movements of the user to train the user to anticipate or recognize a trajectory of the moving object.

2. The non-transitory computer-readable storage media of claim 1, wherein the soundscape data represents a sequence of tones representing the object path and conditions of motion of the moving object.

3. The non-transitory computer-readable storage media of claim 2,
   wherein an initial frequency of the sequence of tones is based on an initial velocity of the moving object, and
   wherein at least one of frequency of the tones in the sequence of tones, volume of the tones in the sequence of tones, stereo balance between output channels, and phase difference between the output channels varies with position of the moving object in the object path.

4. The non-transitory computer-readable storage media of claim 3,
   wherein the object path of the moving object progresses from a first point distal to the user in the simulated environment to a second point proximate the user in the simulated environment,
   wherein the volume of the sequence of tones increases with proximity of the moving object to the user in the simulated environment,
   wherein the frequency of the sequence of tones changes within a ranges of frequencies dependent on height of the moving object along the object path, and
   wherein the stereo balance or the phase difference of the output channels changes with lateral position of the moving object along the object path.

5. The non-transitory computer-readable storage media of claim 1, wherein the simulated environment is a baseball environment with the user having a vantage point from home plate, the moving object is a pitched baseball and the object path is a path of the pitched baseball from a pitcher in the simulated environment to the home plate.

6. The non-transitory computer-readable storage media of claim 5, further comprising instructions for causing the display to the user in the simulated environment at least one of:
   a static release point graphic proximate to a release point of pitched baseball to direct the user to a region of the release point of the pitched baseball in advance of the pitched baseball being pitched;
   a static tunnel zone graphic between the release point of the pitched baseball and home plate through which the object path of the pitched baseball passes;
   a strike zone graphic proximate to the home plate; and
   location zone graphic proximate to the home plate.

7. The non-transitory computer-readable storage media of claim 6, wherein the strike zone graphic is displayed before release of the pitched baseball and then disappears before release of the pitched baseball, the storage media further comprising instructions that when executed by the processor cause the processor to:
   cause the pitched baseball to be rendered invisible during a portion of the path of the pitched baseball, wherein the pitched baseball is visible when it reaches home plate;
   receive before the pitched baseball reached home plate an input from the user as to a ball or strike call or a pitch type; and
   record the input; and
   after the pitched baseball reached home plate, cause display of the path of the pitched baseball with the strike zone graphic.

8. The non-transitory computer-readable storage media of claim 6, further comprising instructions that when executed by the processor cause the processor to:
   cause display of the location zone graphic before release of the pitched baseball, wherein the location zone graphic is divided into a plurality of location zones;
   receive a first input from the user identifying at least two of the location zones through which the pitched baseball must pass;
   record the first input;
   cause termination of the display of the location zone graphic before release of the pitched baseball;
   after release of the pitched baseball and before the pitched baseball reached home plate, receive a second input from the user identifying a prediction of a location zone selected from the at least two locations zones through which the pitched baseball will travel;
   record the second input; and
   provide feedback to the user on accuracy of the prediction.

9. The non-transitory computer-readable storage media of claim 1, further comprising instructions that when executed by the processor cause the processor to cause display to a user of a ghost image of the moving object in the simulated environment that appears ahead of the moving object along the object path to lead the user's eyes along a correct trajectory of the moving object.

10. The non-transitory computer-readable media of claim 1, wherein displaying the moving object comprises modulating transparency of the moving object along the object path in accordance with a fixed interval without occluding a background of the simulated environment.

11. The non-transitory computer-readable storage media of claim 1, further comprising instructions that when executed by the processor cause the processor to:
   detect relative positions of eyes of the user as a function of time during displaying to the user the moving object; and
   compare relative positions of the eyes of the user to the object path data to determine a level of smooth pursuit of the moving object by the user's eyes.

12. The non-transitory computer-readable storage media of claim 1, further comprising instructions that when executed by the processor cause the processor to:
   monitor through one or more sensors connected to the user at least one of stress and focus level of the user,
   based on the monitoring, initiate the displaying of the moving object.

13. The non-transitory computer-readable storage media of claim 1, further comprising instructions that when executed by the processor cause the processor to actuate one or more stimulators attached to the user to assist the user in creating a correct temporal response to the moving object.

14. The non-transitory computer-readable storage media of claim 1, wherein the simulated environment is a baseball environment with the user having a vantage point of a catcher behind home plate, the moving object is a pitched baseball and the object path is a path of the pitched baseball from a pitcher in the simulated environment to the home plate, the storage media further comprising instructions that when executed by the processor cause the processor to:
   track motion and position of the user;
   track motion and position of a glove on the user;
   map the tracked motion and position of the user to motion and position of an avatar in the simulated environment;
   map the tracked motion and position of the glove to a virtual glove on the avatar in the simulated environment; and
   record performance of the user in catching or blocking the pitched baseball.

15. The non-transitory computer-readable storage media of claim 1, wherein the simulated environment is a baseball environment with the user having a vantage point of a catcher behind home plate, the moving object is a pitched baseball and the object path is a path of the pitched baseball from a pitcher in the simulated environment to the home plate, the storage media further comprising instructions that when executed by the processor cause the processor to perform a virtual batting practice simulation, comprising:
   tracking a swing path of bat swung by the user while attempting to hit the pitched baseball;
   mapping the swing path to a virtual bat in the simulated environment;
   determining whether the virtual bat contacts the pitched baseball;
   if the virtual bat contacts the pitched baseball, determining a path and conditions of motion of the pitched baseball after contact;
   recording metrics of the user's hitting mechanics based on the swing path and conditions of motion of the pitched baseball after contact.

16. The non-transitory computer-readable storage media of claim 1, wherein the simulated environment is a baseball environment with the user having a vantage point of an umpire behind home plate, the moving object is a pitched baseball and the object path is a path of the pitched baseball from a pitcher in the simulated environment to the home plate, the storage media further comprising instructions that when executed by the processor cause the processor to:
   receive an input from the user after release of the pitched baseball indicating a choice between a strike call and a ball call;
   recording the input;
   compare the input to whether the pitched baseball corresponded to a virtual strike zone; and
   record a performance of the user based on the comparing step.

17. A system for simulated sports training, comprising:
   storage comprising object path data representing an object path and conditions of motion of a moving object as a function of time, and simulated environment data for a simulated environment having one or more virtual objects of a sporting event;
   a display for displaying the simulated environment;
   a plurality of speakers;
   one or more processors, the one or more processors configured to:
      output to the display the moving object in the simulated environment in accordance with the object path data, wherein the moving object is displayed as moving in a direction toward the user;
      correlate soundscape data to the object path data, the soundscape data being dependent on both the object path and the conditions of motion; and
      output sound to the plurality of speakers based on the correlated soundscape data either before or during displaying to the user the moving object, thereby providing spatial auditory clues for assisting tracking eye movements of the user to train the user to anticipate or recognize a trajectory of the moving object.

18. The system of claim 17, where the display is part of a virtual reality environment comprising headset goggles, glasses, a mobile device having a display or an augmented reality headgear.

19. The system of claim 17, where the display is part of a cave automatic virtual environment.

20. A system for simulated sports training, comprising:
   storage comprising object path data representing an object path and conditions of motion of a moving object as a function of time, and simulated environment data for a simulated environment having one or more virtual objects of a sporting event;
   one or more processors for implementing a staircase adaptive training system employing use of varying degrees of soundscape exposure for a user participating in simulated sport training using the simulated environment, the one or more processor being configured to:
      correlate soundscape data to the object path data, the soundscape data being dependent on both the object path and the conditions of motion of the moving object; and
      vary at least one property of the soundscape data dependent on a degree of success of the user participating in simulated sport training using the simulated environment.

* * * * *